(12) United States Patent
Tanaka et al.

(10) Patent No.: US 7,396,625 B2
(45) Date of Patent: Jul. 8, 2008

(54) TONER, METHOD FOR PRODUCING THE SAME, AND IMAGE-FORMING METHOD USING THE SAME

(75) Inventors: Chiaki Tanaka, Izunokuni (JP); Masayuki Ishii, Numazu (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/520,642

(22) Filed: Sep. 14, 2006

(65) Prior Publication Data

US 2007/0059628 A1 Mar. 15, 2007

(30) Foreign Application Priority Data

Sep. 14, 2005 (JP) ............................ 2005-267511
Sep. 5, 2006 (JP) ............................ 2006-239917

(51) Int. Cl.
*G03G 5/00* (2006.01)

(52) U.S. Cl. .............................. 430/108.11; 430/137.1; 430/137.14; 430/137.15

(58) Field of Classification Search ............ 430/108.11, 430/137.1, 137.14, 137.15

See application file for complete search history.

(56) References Cited

U.S. PATENT DOCUMENTS

| | | | | |
|---|---|---|---|---|
| 5,552,502 | A * | 9/1996 | Odell et al. | 526/234 |
| 5,688,870 | A * | 11/1997 | Wilkinson et al. | 525/244 |
| 6,512,062 | B1 | 1/2003 | DeSimone et al. | |
| 6,660,443 | B2 | 12/2003 | Sugiyama et al. | |
| 6,756,175 | B2 | 6/2004 | Yamada et al. | |
| 6,835,519 | B2 | 12/2004 | Sugiyama et al. | |
| 7,005,223 | B2 | 2/2006 | Yamashita et al. | |
| 7,056,635 | B2 | 6/2006 | Tanaka et al. | |
| 2001/0036586 | A1 | 11/2001 | Adachi et al. | |
| 2003/0096185 | A1 | 5/2003 | Yamashita et al. | |
| 2005/0003291 | A1 | 1/2005 | Takada et al. | |
| 2005/0026066 | A1 | 2/2005 | Takaka et al. | |
| 2005/0031980 | A1 | 2/2005 | Inoue et al. | |
| 2005/0042534 | A1 | 2/2005 | Tanaka et al. | |
| 2005/0164112 | A1 | 7/2005 | Ohki et al. | |
| 2006/0057488 | A1 | 3/2006 | Inoue et al. | |

(Continued)

FOREIGN PATENT DOCUMENTS

EP 1 296 201 A1 3/2003

(Continued)

OTHER PUBLICATIONS

U.S. Ser. No. 11/196,602, filed Aug. 4, 2005, Masahiro Ohki, et al.

(Continued)

*Primary Examiner*—Mark A Chapman
(74) *Attorney, Agent, or Firm*—Oblon, Spivak, McClelland, Maier & Neustadt, P.C.

(57) ABSTRACT

To provide a method for producing a toner in which at least monomers are polymerized in at least one of a supercritical fluid and a subcritical fluid to thereby produce toner particles, wherein at least one of the supercritical fluid and the subcritical fluid contains a fluorine-containing surfactant, and a polymer resulted from polymerization of the monomers is insoluble in at least one of the supercritical fluid and the subcritical fluid, and provide a toner produced by the method for producing the toner.

13 Claims, 5 Drawing Sheets

U.S. PATENT DOCUMENTS

2006/0068312 A1 3/2006 Yamashita et al.
2006/0099529 A1 5/2006 Tanaka et al.

FOREIGN PATENT DOCUMENTS

| JP | 5-66600 | 3/1993 |
|----|---------|--------|
| JP | 8-211655 | 8/1996 |
| JP | 314783 | 12/2000 |
| JP | 2001-312098 | 11/2001 |
| JP | 2004-144778 | 5/2004 |
| JP | 2004-161824 | 6/2004 |
| JP | 2005-107405 | 4/2005 |
| JP | 2006-78895 | 3/2006 |

OTHER PUBLICATIONS

U.S. Ser. No. 11/227,215, filed Sep. 16, 2005, Chiaki Tanaka et al.
U.S. Ser. No. 11/227,566, filed Sep. 16, 2005, Tsuneyasu Nagatomo et al.
U.S. Ser. No. 11/206,128, filed Aug. 18, 2005, Hiroshi Yamashita et al.
U.S. Ser. No. 11/484,565, filed Jul. 12, 2006, Tanaka et al.
U.S. Ser. No. 11/522,936, filed Sep. 19, 2006, Ishii et al.
J. M. DeSimone, et al., "Dispersion Polymerizations in Supercritical Carbon Dioxide", Science, vol. 265, XP-002402031, Jul. 15, 1994, pp. 356-359.
U.S. Ser. No. 11/734,895, filed Apr. 13, 2007, Yamashita et al.
U.S. Ser. No. 11/752,343, filed May 23, 2007, Nagatomo et al.
U.S. Ser. No. 11/853,520, filed Sep. 11, 2007, Inoue et al.

* cited by examiner

TONER, METHOD FOR PRODUCING THE SAME, AND IMAGE-FORMING METHOD USING THE SAME

BACKGROUND OF THE INVENTION

1. Field of the Invention

The present invention relates to a toner suitable for electrophotography, electrostatic recording, electrostatic printing and the like, to a producing method for the same, and to an image-forming method using the toner.

2. Description of the Related Art

Image forming based on electrophotography generally involves a series of the following individual steps: a latent electrostatic image-forming step in which using a variety of means a latent electrostatic image is formed on a photoconductor (hereinafter referred to as a latent electrostatic image bearing member, an image bearing member, and an electrophotographic photoconductor); a developing step in which the formed latent electrostatic image is developed by application of a toner to form a toner image; a transferring step in which the toner image is transferred to a recording member such as a paper; a fixing step in which the toner image transferred to the recording member is fixed thereto by applying heat, pressure, heat and pressure, or vapor of a solvent; and a cleaning step in which toner particles remained on the photoconductor are removed, for example.

It is required that toners for electrophotography be produced by more energy-saving, environment friendly processes. The conventional method of pulverization is employed in the method for producing the toner. However, in recent years, media-based chemical methods such as an emulsion aggregation method, a suspension polymerization method, an emulsion dispersion method, a dissolution and suspension method, and a dissolution, suspension and extension method have been used in most cases for producing the toners.

In the suspension polymerization method, toner materials containing monomers, a polymerization initiator and the like are dispersed in an aqueous medium to form oil droplets, followed by heat treatment to cause a polymerization reaction to take place for producing the toner.

In the emulsion dispersion method, toner materials containing polymers and the like are mixed with an aqueous medium to form oil droplets by allowing the toner materials to be dispersed or emulsified in or with the aqueous medium for producing the toner (see Japanese Patent Application Laid-Open (JP-A) No. 05-66600 and 08-211655). The dissolution and suspension method consists of the suspension preparing step in which an oil component produced by adding a binder resin in an organic solvent in which the binder resin is resolvable is suspended in an aqueous component to be particulate, and the step of removing the organic solvent from the suspension (see Japanese Patent (JP-B) No. 3141783).

In view of recent environmental problems, as chemical toners produced through these chemical methods, chemical toners such as capsule toner, core shell toner, etc. are available, and such toners have a form that enables efficient provision of desired functions.

In such methods for producing toners, which use the pulverization method, how uniformly each constituent material is dispersed and pulverized is important to ensure that the resultant toner particles have uniform shapes. In general, toner particles have amorphous shapes with randomly-sized cross sections, and control of the shape or structure of toner particles become very difficult. Moreover, when a large amount of coloring agents, releasing agents, charge-controlling agents and the like are added to the toner, these additives tend to migrate to the surfaces of toner particles during a pulverization process because they cleavage along the crystal plane of the additives, resulting in a problem that toner characteristics such as flowability and charging properties may be reduced, e.g., variations may occur in the charging properties among individual toner particles.

The methods for producing toners which involve chemical methods can produce toner particles that have smaller diameters and a narrower particle size distribution than those produced by the method for producing the toners involving the pulverization method. However, the toner surface becomes hydrophilic because toner is produced either in water or hydrophilic medium, and then the charging properties of toner particles reduce, the temporal stability and environmental characteristics become unstable. This may cause such problems as abnormal development and transfer operations, toner scatterings, or poor image quality. Moreover, the methods for producing the toner which involve chemical methods entail generation of a large amount of waste solution and require a large amount of energy for drying of produced toner particles. This is not preferred in terms of environmental impact. Therefore, the methods for producing a toner using a supercritical fluid have been developed.

As a method for producing a toner using a supercritical fluid, for example, Japanese Patent Application Laid-Open (JP-A) No. 2001-312098 proposes a method for producing toner particles using RESS (Rapid Expansion of Supercritical Solutions) technique. This technique, however, is applicable to only resin that can be dissolved in supercritical fluids, and provides a narrow range of choice of applicable resins. For example, the solubilities of high-molecular mass ingredients or gels (called H body) needed in the toner are of extremely low solubility. In addition, a supercritical fluid, for example, inexpensive and potent styrene-acrylic resins and polyester resins that are generally used in the toner field are also of extremely low solubility. Thus, there is a problem that they cannot be used as they are.

To solve the foregoing problems Japanese Patent Application Laid-Open (JP-A) Nos. 2004-161824, 2004-144778 and 2005-107405 propose a technique in which rather than dissolving resin in a supercritical fluid, colored resin that has been previously melted and kneaded is granulated by application of shearing force using a dispersing agent in a insoluble condition. This technology has a problem that it broadens the particle size distribution, though a wide range is ensured for the choice of materials. In particular, broader particle distributions are a critical drawback for obtaining high-resolution images as required by recent toners.

No method for producing a toner has been provided that ensures a sharp particle size distribution and excellent toner characteristics such as charging properties, environmental impact, and temporal stability, creates little waste solution, produces toner containing no monomers left over, requires no drying process and is low cost. Likewise, neither a toner produced by this method for producing the toner nor an image-forming apparatus using the toner has been provided.

SUMMARY OF THE INVENTION

It is an object of the present invention to provide a low-cost, environment-friendly method for producing a toner that ensures a sharp particle size distribution and excellent toner characteristics such as charging properties, environmental impact, and temporal stability, creates little waste solution, requires no drying process, and generates no monomers left over, a toner produced by the method for producing a toner and the image-forming method using the toner.

A method for producing a toner of the present invention includes a step of polymerizing at least monomers in at least one of a supercritical fluid and a subcritical fluid to thereby produce toner particles, wherein at least one of the supercritical fluid and the subcritical fluid contains a fluorine-containing surfactant, and wherein a polymer resulted from polymerization of the monomers is insoluble in at least one of the supercritical fluid and the subcritical fluid. In the method for producing the toner of the present invention, either the supercritical fluid or the subcritical fluid is used in stead of an aqueous medium, and polymerization of the monomer and the production of toner particles are performed in at least one of the supercritical fluid and the subcritical fluid. Thus, it is possible to produce a low-cost, environment-friendly toner that ensures a sharp particle size distribution and excellent toner characteristics such as charging properties.

As the toner of the present invention is produced by the method for producing the toner of the present invention, the toner has a sharp particle size distribution and excellent toner characteristics such as charging properties, environmental impact, and temporal stability.

The image-forming method of the present invention includes at least a latent electrostatic image-forming step of forming a latent electrostatic image on a latent electrostatic image bearing member, a developing step of developing the latent electrostatic image using the toner of the present invention to form a visible image, a transferring step of transferring the visible image onto a recording medium, and a fixing step of fixing the transferred visible image transferred to the recording medium. In the image-forming method of the present invention, in the latent electrostatic image-forming step a latent electrostatic image is formed on a latent electrostatic image bearing member. In the developing step the latent electrostatic image is developed using the toner of the present invention to form a visible image. In the transferring step the visible image is transferred onto a recording medium. In the fixing step the transferred image is fixed to the recording medium. As a result, a high-definition, high-sharpness, and high-quality image is obtained.

Figure 1:
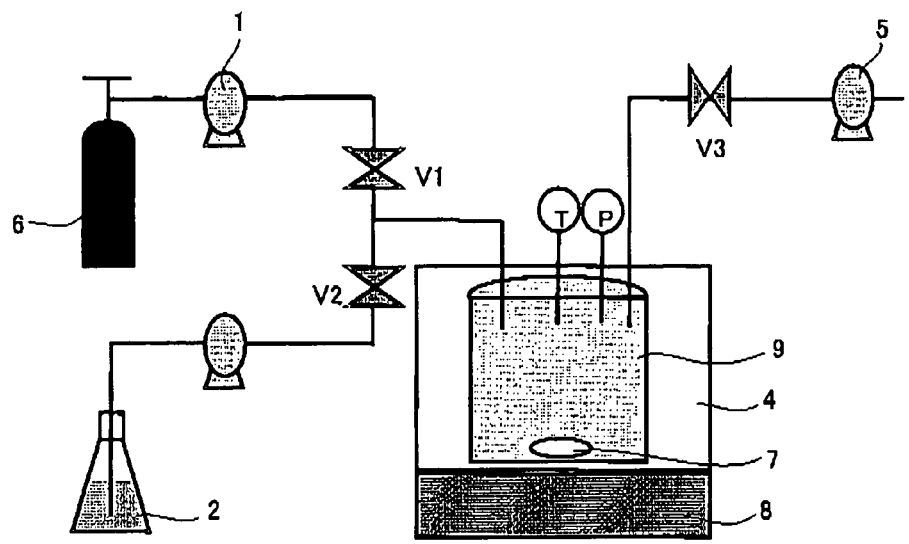
FIG. 1 is a schematic view of an example of a polymerization apparatus employed in the polymerization step of the present invention.

DESCRIPTION OF THE PREFERRED EMBODIMENTS (Toner and Method for Producing Toner)

A method for producing a toner of the present invention includes a step in which at least monomers are polymerized in at least one of a supercritical fluid and a subcritical fluid to thereby produce toner particles, and further includes additional steps as needed.

In the method for producing the toner of the present invention, at least one of the supercritical fluid and the subcritical fluid contains fluorine containing surfactant, and a polymer resulted from polymerization of the monomers is insoluble in at least one of the supercritical fluid and the subcritical fluid.

The toner of the present invention is produced by the method for producing the toner according to the present invention.

Hereinafter, details of the toner of the present invention will be described by describing the method for producing the toner of the present invention.

Herein, "the polymer resulted from the polymerization of the monomers is insoluble in (incompatible with) at least one of the supercritical fluid and the subcritical fluid" means a condition such that a cloudiness or phase separation is observed though a inspection window of a high-pressure vessel (internal volume: 50 mol) when 1 g of the polymer resulted from polymerization of the monomers as a test material and at least one of the supercritical fluid and the subcritical fluid are placed and agitated in the high-pressure vessel with the inspection window for a given period of time (e.g., 30 minutes).

The polymerizable monomers are not particularly limited and can be appropriately selected depending on the intended purpose, as long as the polymer (a binder resin) resulted from polymerization can be used to form images. Suitable examples thereof include radically polymerizable monomers such as vinyl monomers, styrenes, methyl acrylate, divinylbenzene, n-butyl acrylate, n-butyl methacrylate, and 2-ethylhexyl methacrylate. These may be used singly or in combination.

The supercritical fluid is not particularly limited and can be appropriately selected depending on the intended purpose, as long as it exists as a non-compressible, high-density fluid above its critical temperature and critical pressure (critical points) where gas and liquid can co-exist, exists as a fluid at or above its critical temperature and critical pressure, and will never be condensed even when compressed. However, those with low critical temperature are preferable.

In addition, the subcritical fluid is not particularly limited and can be appropriately selected depending on the intended purpose, as long as it exists as a high-pressure liquid at points close to its critical temperature and critical pressure.

In the present invention, carbon dioxide is preferably used as the supercritical fluid and subcritical fluid. The carbon dioxide can be readily converted to a supercritical state because it has a critical pressure of as low as 7.3 MPa and a critical temperature of as low as 31° C. Supercritical carbon dioxide is nonflammable, thus it can be handled easily. In addition, it is excellent in toner characteristics as carbon dioxide is non-aqueous medium.

In the present invention, other fluids may also be used together with the supercritical carbon dioxide and subcritical carbon dioxide. The other fluids may preferably easily control a solubility of a toner constituting materials. Examples thereof include $N_2O$, ethane, propane, and ethylene.

Moreover, an organic solvent as an entrainer may be used together with the supercritical carbon dioxide and subcritical carbon dioxide. This enables the solubility of the toner constituting materials to easily be controlled. The entrainer is not particularly limited and can be appropriately selected depending on the intended purpose. Examples thereof include methanol, ethanol, propanol, ammonia, melamine, urea, and thioethylene glycol.

In the present invention, fluorine-containing vinyl monomer, a polymer resulted from polymerization of a fluorine-containing vinyl monomer can be used as a fluorine-containing surfactant. The fluorine-containing vinyl monomers are not particularly limited and can be appropriately selected depending on the intended purpose. Examples thereof include acrylic acid or derivative thereof having perfluoroalkyl group, methacrylic acid or derivative thereof having perfluoroalkyl group.

Examples of the polymer (homopolymer or copolymer) resulted from polymerization of the fluorine-containing vinyl monomer include a homopolymer of the fluorine-containing monomer, and a copolymer of the fluorine-containing monomer and other polymerizable monomers. Examples of the other polymerizable monomers include vinyl monomers, styrenes, methyl acrylate, divinylbenzene, n-butyl acrylate, n-butyl methacrylate, and 2-ethylhexyl methacrylate.

A polymer resulted from polymerization of a fluorine-containing vinyl monomer may be preferably a compound having a unit represented by the following General Formula (1).

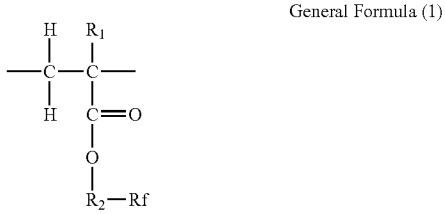

General Formula (1)

where $R_1$ represents any one of a hydrogen atom and an alkyl group having 1 to 4 carbon atoms, $R_2$ represents a substituted or unsubstituted alkylene group having 1 to 4 carbon atoms, and Rf represents a perfluoroalkyl group having 1 to 20 carbon atoms.

In the polymer the relative proportion of the unit represented by the General Formula (1) is preferably 1 mole % to 100 mole %, and more preferably 10 mole % to 100 mole %. If the relative proportion is less than 1 mole %, the property of surface activity to carbon dioxide may be insufficient.

In addition, the fluorine-containing vinyl monomer may preferably contain a compound represented by the following General Formula (2).

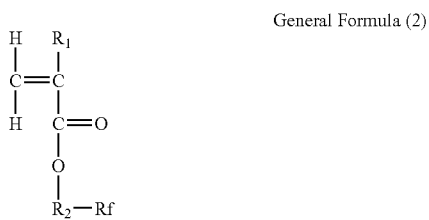

General Formula (2)

where $R_1$ represents any one of a hydrogen atom and an alkyl group having 1 to 4 carbon atoms, $R_2$ represents a substituted or unsubstituted alkylene group having 1 to 4 carbon atoms, and Rf represents a perfluoroalkyl group having 1 to 20 carbon atoms.

In the General Formulas (1) and (2), $R_1$ may be any one of a hydrogen atom and an alkyl group having 1 to 4 carbon atoms, and examples thereof include methyl group, ethyl group, propyl group, isopropyl group, n-butyl group, sec-butyl group, and tert-butyl group.

$R_2$ may be a substituted or unsubstituted alkylene group having 1 to 4 carbon atoms, and examples thereof include methylene group, ethylene group, propylene group, isopropylene group, 2-hydroxypropylene group, butylene group, and 2-hydroxybutylene group.

Rf may be preferably a perfluoroalkyl group having 1 to 20 carbon atoms, and more preferably a perfluoroalkyl group having 4 to 20 carbon atoms.

The polymer resulted from polymerization of the fluorine-containing vinyl monomer may be preferably a compound (homopolymer or copolymer) resulted from a reaction of the compound represented by the General Formula (2). For example, the polymer may be synthesized from polymerization reaction of the fluorine-containing vinyl monomer in a fluorine-containing solvent such as HCFC225. Alternatively, it is preferable to be synthesized in a supercritical carbon dioxide as a reaction solvent, which allows to reduce environmental impact.

The polymerization reaction may be preferably either a bulk polymerization or a living radical polymerization.

—Bulk Polymerization—

The bulk polymerization includes, for example, (1) in an inactive gas atmosphere such as nitrogen in a reaction vessel under reduced or increased pressure, or at normal pressure, a polymerization is initiated from a thermal radical generated from a polymerizable monomer by heating a monomer composition containing a polymerizable monomer, or (2) in an inactive gas atmosphere such as nitrogen in a reaction vessel under reduced or increased pressure, or at normal pressure, a polymerization is initiated from a racial generated from a radical polymerization initiator by adding the radical polymerization initiator to a monomer composition containing a polymerizable monomer.

The radical polymerization initiator is not particularly limited and can be appropriately selected depending on the intended purpose. Examples thereof include diacyl peroxides such as benzoyl peroxide, 2,4-dichlorobenzoyl peroxide, p-chlorobenzoyl peroxide, o-methylbenzoyl peroxide, bis-3,5,5-trimethyl cyclohexanol peroxide; dialkyl peroxides such as dicumyl peroxide, 2,5-dimethyl-2,5-di(tert-butyl peroxy) hexane, tert-butyl cumyl peroxide, di-tert-butyl peroxide, 1,3-bis(tert-butyl peroxy isopropyl) benzene; peroxyketals such as 1,1-di(tert-butyl peroxy)cyclohexane; alkyl peresters such as tert-butyl peroxy benzoate; organic peroxides such as percarbonate e.g. diisopropyl peroxydicarbonate; and azo compounds such as 2,2'-azobisisobutyronitrile (hereinafter referred to as AIBN), 2,2'-azobis -2,4-dimethylvaleronitrile, 2,2'-azobis-cyclohexylnitrile, 1,1'-azobis-(cyclohexane-1-carbonitrile), 2-phenylazo-4-methoxy-2,4-dimethylvaleronitrile. These materials may be used singly or in combination.

The added amount of the radical polymerization initiator is preferably 0.01 parts by mass to 2 parts by mass, and more preferably 0.01 parts by mass to 1.5 parts by mass based on 100 parts by mass of the polymerizable monomers. This is because most of the initiators may be used at the beginning of the polymerization, the polymerization may be hard to be completed if the amount of the initiators is less, and on the other hand, the amount of the generated radical may be larger and a polymer with sufficient molecular mass is hard to be obtained if the amount of the initiators is larger. The polymerization temperature is normally preferably 50° C. to 220° C., and more preferably 80° C. to 150° C.

Moreover, in the bulk polymerization, the molecular mass of produced polymers can be adjusted by adding a chain transfer agent. The chain transfer agent is not particularly limited as long as it can be normally used for the polymerization or copolymerization of the radically polymerizable monomer, and can be appropriately selected depending on the intended purpose. Examples thereof include mercaptans such as methyl mercaptan, tert-butyl mercaptan, decyl mercaptan, benzyl mercaptan, lauryl mercaptan, stearyl mercaptan, n-dodecyl mercaptan, tert-dodecyl mercaptan, mercaptoacetic acid, mercaptopropionic acid; alcohols such as methanol, propanol, butanol, isobutanol, tert-butanol, hexanol, benzyl alcohol, allyl alcohol; and halogenated hydrocarbons such as chloroethane, fluoroethane, trichloroethylene, carbon tetrachloride. These may be used singly or in combination. Among these, the mercaptans and n-dodecyl mercaptan are particularly preferable. The. chain transfer agent may be charged in a reaction vessel before polymerization, or added continuously or sequentially during polymerization.

The added amount of the chain transfer agent is usually preferably 0.01 parts by mass to 1 part by mass, and more preferably 0.05 parts by mass to 0.5 parts by mass based on 100 parts by mass of the polymerizable monomers. When the added amount is less than 0.01 parts by mass, it may be difficult to produce polymers because the viscosity of polymerization system is higher, and when the added amount is more than 1 part by mass, the molecular mass of produced polymers may be reduced.

The methods of terminating the polymerization is not particularly limited and can be appropriately selected from the known methods as long as a chain transfer of propagating radical is terminated and disappeared. For example, this is operated as following methods: (1) adding 50 ppm to 5,000 ppm of a polymerization terminator to a polymer liquid; (2) blowing oxygen and air to a polymer liquid; and (3) cooling a polymer liquid to 40° C. or less. These may be used singly or in combination.

The polymerization terminator means a compound which immediately reacts with a radical generated from at least any one of a polymerizable monomer and a polymerization initiator, and changes the radical to a stable radical or a neutral substance by which subsequent polymerization is not occurred. The polymerization terminator is not particularly limited and can be appropriately selected depending on the intended purpose. Examples thereof include quinones such as p-benzoquinone, naphthoquinone, phenanthraquinone, 2,5-diphenyl-p-benzoquinone; hydroquinones such as hydroquinone, p-tert-butylcatechol, 2,5-di-tert-butyl hydroquinone, mono-tert-butyl hydroquinone; phenols such as di-tert-butyl paracresol-hydroquinone monomethyl ether, α-naphthol; organic and inorganic copper salts such as copper naphthenate; amidines such as acetamidine acetate, acetamidine sulfate; hydrazine salts such as phenylhydrazine hydrochloride, hydrazine hydrochloride; quaternary ammonium salts such as trimethyl benzyl ammonium chloride, lauryl pyridinium chloride, cetyltrimethylammonium chloride, phenyltrimethylammonium chloride; polyhydric phenols such as pyrogallol, tannic acid, resorcinol; and oximes such as a nitro compound. These may be used singly or in combination.

—Living Radical Polymerization—

As the living radical polymerization method, two living radical polymerization methods such as TEMPO (2,2,6,6-tetramethylpiperidinyl-1-oxy) method, an iodine transfer polymerization are preferably used.

The TEMPO method can be referred to the report of M. K. Georges et al., Trends Polym. Sci., 2, p. 66, 1994. The iodine transfer polymerization method can be referred to the report of M. Tatemoto, Japanese Journal of Polymer Science and Technology, 49, p. 765, 1992.

In the TEMPO method, generally a stable nitroxy free radical (=N—O) is used as a radical capping agent. The radical capping agent is not limited and can be appropriately selected depending on the intended purpose. Examples thereof include a cyclic hydroxylamine-derived nitroxy free radicals such as 2,2,6,6-substituted-1-piperidinyl oxyradical, and 2,2,5,5-substituted-1-pyrrolidinyl oxyradical are preferable. As the substituted group, alkyl groups having 4 or less carbon atoms such as methyl group and ethyl group are appropriate.

Examples of the nitroxy free radical compounds include the 2,2,6,6-tetramethyl-1-piperidinyl oxyradical (TEMPO), 2,2,6,6-tetraethyl-1-piperidinyl oxyradical, 2,2,6,6-tetramethyl-4-oxo-1-piperidinyl oxyradical, 2,2,5,5-tetramethyl-1-pyrrolidinyl oxyradical, 1,1,3,3-tetramethyl-2-isoindolinyl oxyradical, and N,N-di-tert-butylamine oxyradical. In addition, in stead of the nitroxy free radical, a stable free radical such as the galvinoxyl free radical may be also used.

The radical capping agents are used in combination with a heat radical generator. It is presumable that the polymerization of addition-polymerizable monomer may be proceeded as a reactant resulted from a radical capping agent and a heat radical generator acts as a polymerization initiator. The ratio of the combination is not particularly limited, and can be appropriately selected depending on the intended purpose, but 0.1 moles to 10 inoles of the heat radical generator based on 1 mole of the radical capping agent may be preferable.

The heat radical generator is not particularly limited and various compounds may be used, and preferably a peroxide and an azo compound which may generate a radical at polymerization temperature. Examples of the peroxides, are not particularly limited, include diacyl peroxides such as benzoyl peroxide and lauroyl peroxide; dialkyl peroxides such as dicumyl peroxide and di-tert-butyl peroxide; peroxydicarbonates such as diisopropyl peroxydicarbonate and bis(4-tert-butylcyclohexyl) peroxydicarbonate, alkyl peresters such as tert-butyl peroxyoctoate and tert-butyl peroxybenzoate. Among these, benzoyl peroxide is particularly preferable. Examples of the azo compounds include 2,2'-azobisisobutyronitrile, 2,2'-azobis(2,4-dimethylvaleronitrile, 2,2'-azobis(4-methoxy-2,4-5 dimethylvaleronitrile), and dimethyl azobis isobutyrate. Among these, dimethyl azobis isobutyrate is particularly preferable.

The solvents used for the living radical polymerization is not particularly limited, and can be appropriately selected depending on the intended purpose. Examples thereof include apolar solvents: cycloalkanes such as cyclohexane, cycloheptane; saturated carboxylic esters such as -ethyl acetate, n-butyl acetate, isobutyl acetate, methyl propionate, propylene glycol monomethyl ether acetate; alkyl lactones is such as y-butyrolactone; ethers such as tetrahydrofuran, dimethoxyethanes, diethoxyethanes; alkyl ketones such as 2-butanone, 2-heptanone, methyl isobutyl ketone; cycloalkyl ketones such as cyclohexanone, alcohols such as 2-propanol, propylene glycol monomethyl ether; aromatic series such as toluene, xylene, chlorobenzene; dimethylformamide; dimethyl sulfoxide; and dimethylacetamide; and N-methyl-2- pyrrolidone. These may be used singly or in combination. However, these solvents may not be used.

The reaction temperature in the living radical polymerization is preferably 40° C. to 150° C., and more preferably 50° C. to 130° C. The reaction time is preferably 1 hour to 96 hours, and more preferably 1 hour to 72 hours.

The fluorine-containing surfactant which is preferably used has high affinity and solubility for the solvent, and high affinity and absorptive property to the surface of the polymer particles to mainly protect sterically from uniting among polymer particles, as well as has a molecular chain having a certain degree of length to increase acting repulsively sterically among polymer particles. The mass-average molecular mass of the fluorine-containing surfactant is preferably 400 to 10,000,000, more preferably 400 to 5,000,000, and still more preferably 400 to 2,500,000. This is because the solubility for the fluorine-containing is surfactant to the supercritical fluid and the subcritical fluid becomes worse and the fluorine-containing surfactant is likely not to contribute to forming particles, when the mass average molecular mass is high.

The sample preparation and the measurement of mass-average molecular mass of the fluorine-containing surfactant is carried out by GPC (Gel Permeation Chromatography) under the following condition:

—Sample Preparation Method—

HFIP (hexafluoropropanol) solution in which $CF_3COONa$ is adjusted to be 5mM is used, and a sample is dissolved to be the concentrations of 0.15% by mass.

[Measurement Conditions]
Instrument: HLC-8220-GPC (Tosoh Corporation)
Columns: TSK-gel GMH HR-M (Tosoh Corporation)
Temperature: 40° C.
Solvent: HFIP (hexafluoropropanol)
Flow rate: 0.2 ml/min.
Samples: samples with the concentrations of 0.15% by mass (10 µl)

In this way a molecular mass distribution of the fluorine-containing surfactant is obtained, and using a molecular mass calibration curve constructed from monodisperse polystyrene standards, the mass-average molecular mass of the fluorine-containing surfactant can be calculated.

In the polymerization step, the less the added amount of the fluorine-containing surfactant is, the lower the production cost becomes. Thus, the less added amount is preferable. The content of the fluorine-containing surfactant is preferably 0.01 parts by mass to 50 parts by mass, and more preferably 0.01 parts by mass to 30 parts by mass based on 100 parts by mass of the polymerizable monomer. If the content of the fluorine-containing surfactant is less than 0.01 parts by mass, the toner particles may not be sometimes obtained. If the amount of the fluorine-containing surfactant is more than 50 parts by mass, the production cost becomes higher and not practical.

In the polymerization step, the pressure condition is preferably 8 MPa to 100 MPa, and more preferably 10 MPa to 50 MPa. If the pressure condition is less than 8 MPa, the dissolved amount of the surfactant is decreased and the property of surface activity tends to be insufficient. Thus, the toner particles cannot be stably obtained, and the concentration of the polymerizable monomer in the reaction system cannot be increased, which may result in an inefficient production condition. On the other hand, if the pressure condition is more than 100 MPa, the cost of the devices for pressure resistant facilities becomes high, and the toner particles become swell and resolve easily.

In polymerization step, the heating condition is preferably 30° C. to 150° C., and still more preferably 35° C. to 130° C. If the heating condition is lower than 30° C., the reaction time may easily become longer and a polymerization conversion ratio may easily decline. If the heating condition is higher than 150° C., the toner particles may not be able to be obtained stably, and production energy and cost may be raised.

In the polymerization step, the polymerizable monomer is preferably polymerized in the fluid (supercritical carbon dioxide or subcritical carbon dioxide) further containing a releasing agent. This allows to obtain a toner having a good dispersibility of the releasing agent.

In the present invention, the polymerization initiator can be used to polymerize a polymerizable monomer. The polymerization initiator may be selected optionally in consideration of a reaction temperature and 10 hour half-life. Examples thereof include azo-based polymerization initiators such as 2,2'-azobisisobutyronitrile, and 2,2'-azobis(2,4-dimethylvaleronitrile); and peroxide-based initiators such as lauryl peroxide, benzoyl peroxide, tert-butyl peroctoate, and potassium persulfate. The polymerization initiators may be combined with sodium thiosulfate, amines and the like.

The added amount of the polymerization initiator is preferably 0.1 parts by mass to 10 parts by mass based on 100 parts by mass of the polymerizable monomer.

For increasing polymerization efficiency of the polymerizable monomer, the polymerization time is preferably 5 hours to 40 hours. It is possible to quench the reaction in the process thereof to obtain a toner with a desired particle diameter and desired particle size distribution.

In order to adjust the molecular mass, the polymerization may be carried out by adding a compound having a large chain transfer constant. Examples of the compounds having a large chain transfer constant include low-molecular mass compounds having mercapto groups, carbon tetrachloride, and carbon tetrabromide.

Next, a method for forming the polymer resulted from the polymerizable monomers using the polymerization apparatus will be described.

The polymerization apparatus shown in FIG. 1 has a pressure-resistant reaction cell 9 of 1,000 ml in volume. In FIG. 1, 2 represents an entrainer tank, 1 represents a pressure pump, 7 represents a stirrer, 8 represents a stirring device, V1 to V3 each represents valve 1 to valve 3, T represents a temperature sensor, and P represents a pressure sensor.

Here, carbon dioxide ($CO_2$) is used as a supercritical fluid.

A composition containing at least polymerizable monomers and fluorine-containing surfactants are placed into the pressure-resistant reaction cell 9, all valves V1 to V3 are closed.

Next, V1 and V3 are opened, and liquefied $Co_2$ is introduced from a gas container 6 into the pressure-resistant reaction cell 9 by the pressure pump 1, while controlling the whole pressure of the polymerization apparatus by a back pressure valve 5. At the same time, the temperature in the pressure-resistant reaction cell 9 is controlled by a temperature-controlling jacket 4.

While the inside of the pressure-resistant reaction cell 9 is stirred, controlling the temperature at 65° C. and the pressure at 30 Mpa. After the temperature and the pressure is stabled, V1 and V3 are closed and reaction is performed for 40 hours. After termination of the reaction, V3 is opened, and gradually the temperature is cooled to 25° C. and the pressure is reduced to atmospheric pressure in the pressure-resistant reaction cell 9 by controlling the temperature-controlling jacket 4 and the back pressure valve 5, thereby obtaining the intended polymer.

At this time, the supercritical carbon dioxide fluid and the component dissolved in the supercritical carbon dioxide fluid are recovered by a recovery mechanism (not shown), and further separated into carbon dioxide and recovery compositions by a separating device (not shown), and then each of them are recycled.

In the present invention, the mass-average molecular mass of the binder resin which is the polymer substance produced by the polymerization of the polymerizable monomer can be appropriately selected depending on the intended purpose. The mass-average molecular mass of the binder resin is preferably 1,000 or more, more preferably 2,000 to 10,000,000, and most preferably 3,000 to 1,000,000. If the mass-average molecular mass of the binder resin is less than 1,000, anti-hot-offset property may be decreased.

The number-average molecular mass and mass-average molecular mass of the binder resins can be determined by GPC (Gel Permeation Chromatography) under the following condition:

Instrument: GPC- 150C (Waters Corporation)
Columns: KF801-807 (Shodex)
Temperature: 40° C.
Solvent: THF (tetrahydrofuran)
Flow rate: 1.0 ml/min
Samples: samples containing concentrations of 0.05% by mass to 0.6% by mass (0.1 ml)

In this way a molecular mass distribution of the binder resin is obtained, and using a molecular mass calibration curve constructed from monodisperse polystyrene standards, the number-average molecular mass and mass-average molecular mass of the binder resin can be calculated.

The glass transition temperature of the binder resin is not particularly limited and can be appropriately selected depending on the intended purpose. The glass transition temperature of the binder resin is preferably 30° C. to 85° C., and more preferably 40° C. to 75° C. If the glass transition temperature is lower than 30° C., the thermal stability of toner may be decreased. If the glass transition temperature is higher than 85° C., the low-temperature fixing property may be insufficient.

The glass transition temperature (Tg) as used herein is determined in the following manner using TA-60WS and DSC-60 (Shimadzu Corp.) as a measuring device under the conditions described below.

[Measurement Conditions]
Sample container: aluminum sample pan (with a lid)
Sample amount: 5 mg
Reference: aluminum sample pan (10 mg of alumina)
Atmosphere: nitrogen (flow rate: 50 ml/min)
Temperature condition:
Start temperature: 20° C.
Heating rate: 10° C./min
Finish temperature: 150° C.
Hold time: 0
Cooling rate: 10° C./min
Finish temperature: 20° C.
Hold time: 0
Heating rate: 10° C./min
Finish temperature: 150° C.

Measurement results are analyzed using date analysis software (TA-60, version 1.52, Shimadzu Corp.). The glass transition temperature is determined from DrDSC curve—a DSC transition curve for the second heating operation—by a glass transition temperature analysis function of the device. In the present invention the first shoulder portion of the graph, where glass transition starts, is defined as the glass transition temperature.

The additive which can be added to the toner of the present invention is not particularly limited and can be appropriately selected depending on the intended purpose. Examples thereof include a colorant, a releasing agent, an inorganic particle, a charge-controlling agent, a flowability improver, and a cleaning improver.

The colorant is not particularly limited and can be appropriately selected from known dyes and pigments depending on the intended purpose. Examples include carbon black, nigrosine dyes, iron black, Naphthol Yellow S, Hansa Yellow (10G, 5G, G), cadmium yellow, yellow iron oxide, yellow ocher, chrome yellow, Titan Yellow, Polyazo Yellow, Oil Yellow, Hansa Yellow (GR, A, RN, R), Pigment Yellow L, Benzidine Yellow (G, GR), Permanent Yellow (NCG), Vulcan Fast Yellow (5G, R), Tartrazine Lake, Quinoline Yellow Lake, anthracene yellow BGL, isoindolinone yellow, colcothar, red lead oxide, lead red, cadmium red, cadmium mercury red, antimony red, Permanent Red 4R, Para Red, Fire Red, parachlororthonitroaniline red, Lithol Fast Scarlet G, Brilliant Fast Scarlet, Brilliant Carmine BS, Permanent Red (F2R, F4R, FRL, FRLL, F4RH), Fast Scarlet VD, Vulcan Fast Rubine B, Brilliant Scarlet G, Lithol Rubine GX, Permanent Red F5R, Brilliant Carmine 6B, Pigment Scarlet 3B, Bordeaux 5B, Toluidine Maroon, Permanent Bordeaux F2K, Helio Bordeaux BL, Bordeaux 10B, BON Maroon Light, BON Maroon Medium, eosine lake, Rhodamine Lake B, Rhodamine Lake Y, Alizarine Lake, Thioindigo Red B, Thioindigo Maroon, Oil Red, quinacridone red, Pyrazolone Red, Polyazo Red, Chrome Vermilion, Benzidine Orange, Perynone Orange, Oil Orange, cobalt blue, cerulean blue, Alkali Blue Lake, Peacock Blue Lake, Victoria Blue Lake, metal-free phthalocyanine blue, Phthalocyanine Blue, Fast Sky Blue, Indanthrene Blue (RS, BC), indigo, ultramarine, Prussian blue, Anthraquinone Blue, Fast Violet B, Methyl Violet Lake, cobalt violet, manganese violet, dioxazine violet, Anthraquinone Violet, chrome green, zinc green, chromium oxide, viridian, emerald green, Pigment Green B, Naphthol Green B, Green Gold, Acid Green Lake, Malachite Green Lake, Phthalocyanine Green, Anthraquinone Green, titanium oxide, zinc white, and lithopone. These may be used singly or in combination.

The content of the colorant in the toner is not particularly limited and can be appropriately selected depending on the intended purpose. The content of the colorant is preferably 0.1 mass % to 15 mass %, and more preferably 1 mass % to 10 mass %. If the content of the colorant is less than 0.1 mass %, the coloring power of the toner may be reduced. If the content of the colorant is more than 15 mass %, the pigment is poorly dispersed in the toner, and then the coloring power and electric property of the toner may be decreased.

The colorant may be used as a master batch in a composite with a resin as well. The resins are not particularly limited and can be appropriately selected from those known in the art depending on the intended purpose. Examples thereof include a styrene and a polymer of the substitution product thereof, a styrene copolymer, polymethylmethacrylate, polybutylmethacrylate, polyvinyl chloride, polyvinyl acetate, polyethylene, polypropylene, polyester resins, epoxy resins, epoxy polyol resins, polyurethane resins, polyamide resins, polyvinyl butyral resins, polyacrylic acid, rosin, modified rosin, terpene resin, aliphatic or alicyclic hydrocarbon resins, aromatic petroleum resins, chlorinated paraffin and paraffin. These resins may be used singly or in combination. Among these, a styrene or a substitution product thereof, and a styrene copolymer are particularly preferable.

Examples of the styrene or a polymer of the substitution product thereof include polyester resin, polystyrene, poly(p-chlorostyrene) and polyvinyltoluene. Examples of the styrene copolymers include styrene-p-chlorostyrene copolymer, styrene propylene copolymer, styrene-vinyltoluene copolymer, styrene-vinylnaphthalene copolymer, styrene-methyl acrylate copolymer, styrene-ethyl acrylate copolymer, styrene-butyl acrylate copolymer, styrene-octyl acrylate copolymer, styrene-methyl methacrylate copolymer, styrene-ethyl methacrylate copolymer, styrene butyl methacrylate copolymer, styrene-a chloromethyl methacrylate copolymer, styrene-acrylonitrile copolymer, styrene-vinyl methyl ketone copolymer, styrene-butadiene copolymer, styrene-isoprene copolymer, and styrene-acrylonitrile-indene copolymer, styrene-maleic acid copolymer, styrene-maleate copolymer.

The master batch can be produced by mixing and kneading the resin and colorant under high shear force. An organic solvent is preferably added to increase interaction between the colorant and the resin. A flushing method is preferably used to produce the master batch, because a wet cake of the colorant can be used directly without drying. The flushing method may be used in which an aqueous paste containing water and a colorant is mixed and kneaded together with the resin and the organic solvent so that the colorant approaches to the resin and then the water and the organic solvent are removed thereafter. For the mixing and kneading, a high shear dispersing machine such as a three roller mill, or the like may be preferably used.

In the present invention, the binder resin produced by the polymerization step can be colored with an entrainer. The entrainer may be preferably selected from those that cannot dissolve binder resins or those that cause the binder resins to swell upon exposure thereto. More specifically, the difference in solubility parameter value between the entrainer and binder resins (hereinafter referred to as "SP") is preferably 1.0 or greater, and more preferably 2.0 or greater. In a case of styrene-acrylic resins, for example, either alcohols with higher values of SP such as methanol, ethanol and n-propane or those with lower values of SP such as n-hexane and n-heptane are preferably used. However, if the SP value difference is more than 5, it results in poor wettability of the binder resin and thus they are not well dispersed in the solution.

A ratio of SP to the entrainer (D1) to SP to the organic solvent which can solve the binder resin (D2) is represented by D1/D2. The D1/D2 of the dye for coloring may be 0.5 or less. A disperse dye, an oil-soluble dye, a vat dye are preferably used to enhance the powder resistance of the toner. Among these, the oil-soluble dye is most preferable. The various kinds of dyes can be used depending on coloring. If the powder resistance is decreased, a transfer rate may be poor.

Examples of coloring methods include following methods: a binder resin, a dye and an entrainer are charged in a pressure-resistant container and treated in a supercritical fluid; and a liquid in which a dye is dissolved and dispersed in an entrainer is charged in a pressure-resistant container, and then treated in a supercritical fluid.

The mass ratio of the dye to the binder resin can be appropriately selected depending on a coloring degree, and is preferably 1 part by mass to 50 parts by mass based on 100 parts by mass of the binder resin.

The dyes are not particularly limited and can be appropriately selected depending on the intended purpose. Examples thereof include C.I.SOLVENT YELLOW (6, 9, 17, 31, 35, 100, 102, 103, 106), C.I.SOLVENT ORANGE (2, 7, 13, 14, 66), C.I.SOLVENT RED (5, 16, 17, 18, 19, 22, 23, 143, 145, 146, 149, 150, 151, 157, 158), C.I.SOLVENT VIOLET (31, 32, 33, 37), C.I.SOLVENT BLUE (22, 63, 78, 83-86, 191, 194, 195, 104), C.I.SOLVENT GREEN (24, 25), and C.I.SOLVENT BROWN (3, 9).

In addition, examples of commercially available dyes include Aizen SOT dyes such as Yellow-1, 3, 4, Orange-1, 2, 3, Scarlet-1, Red-1, 2, 3, Brown-2, Blue-1,2, Violet-1, Green-1, 2, 3, and Black-1, 4, 6, 8 (produced by Hodogaya Chemical Co., Ltd.); Sudan dyes such as Yellow-146, 150, Orange-220, Red-290, 380, 460, and Blue-670 (produced by BASF Japan, Ltd.); Diaresin Yellow-3G, F, H2G, HG, HC, HL, Diaresin Orange-HS, G, Diaresin Red-GG, S, HS, A, K, H5B, Diaresin Violet-D, Diaresin Blue-J, G, N, X, P, H3G, 4G, Diaresin Green-C, and Diaresin Brown-A (produced by Mitsubishi Chemical Industries. Ltd.); Oil Color Yellow-3G, GG-S, #105, Oil Color Orange-PS, PR, #201, Oil Color Scarlet-#308, Oil Color Red-5B, Oil Color Brown-GR, #416, Oil Color Green-BG, #502, Oil Color Blue-BOS, IIN, and Oil Color Black-HBB, #803, EB EX (produced by Orient Chemical Industries, Ltd.); Sumiplast Blue-GP, OR, Sumiplast Red-FB, 3B, and Sumiplaet Yellow FL7G, GC (produced by Sumitomo Chemical Co., Ltd.); and Kayaron Polyester Black EX-SF300, Kayaset Red-B, and Kayaset Blue-A-2R (produced by Nihon Kayaku Co., Ltd).

The releasing agent is not particularly limited and can be appropriately selected from those known in the art depending on the intended purpose. Wax is suitable example. Examples of such wax include low-molecular mass polyolefin wax, synthesized hydrocarbon wax, natural wax, petroleum wax, high fatty acids and metal salts thereof, high fatty acid amides, and modifications of the above-listed wax. These may be used singly or in combination.

Examples of the low-molecular mass polyolefin wax include low-molecular mass polyethylene wax and low-molecular mass polypropylene wax. Examples of the synthesized hydrocarbon wax include Fischer-Tropsh wax. Examples of the natural wax include bee wax, Carnauba wax, Candelilla wax, rice wax, and Montan wax. Examples of the petroleum wax include paraffin wax, and microcrystalline wax. Examples of the high fatty acids include stearic acid, palmitic acid, and myristic acid.

The melting point of the releasing agent is not particularly limited and can be appropriately determined depending on the intended purpose. The melting point of the releasing agent is preferably 40° C. to 160° C., more preferably 50° C. to 120° C., and still more preferably 60° C. to 90° C. If the melting point of the releasing agent is lower than 40° C., the wax may have negative effects on thermal stability. If the melting point of the releasing agent is higher than 160° C., it is likely that cold offset may occur during a low-temperature fixing process, and a paper sheet is likely to wind itself around the fixing device.

The content of the releasing agent in the toner is not particularly limited and can be appropriately determined depending on the intended purpose. The content of the releasing agent is preferably 0 mass % to 40 mass %, and more preferably 3 mass % to 30 mass %. If the content of the releasing agent is more than 40 mass %, the low-temperature fixing property may be reduced, and the image quality may be reduced owing to excessive glossiness.

The inorganic particle is not particularly limited and can be appropriately selected from those known in the art. Examples thereof include silica, alumina, titanium oxide, barium titanate, magnesium titanate, calcium titanate, strontium titanate, zinc oxide, tin oxide, silica sand, clay, mica, wollastonite, diatom earth, chrome oxide, cerium oxide, colcothar, antimony trioxide, magnesium oxide, zirconium oxide, barium sulfate, barium carbonate, calcium carbonate, silicon carbide and silicon nitride. These may be used singly or in combination.

The primary particle diameter of the inorganic particle is preferably 5 nm to 2 μm, and more preferably 5 nm to 500 nm. The specific surface of the inorganic particle by BET method is preferably 20 $m^2/g$ to 500 $m^2/g$.

The content of the inorganic particle in the toner is preferably 0.01 mass % to 5.0 mass %, and more preferably, 0.01 mass % to 2.0 mass %.

The inorganic particles can be preferably used as an external additive of the toner.

The charge controlling agent is not particularly limited and can be appropriately selected from those known in the art. However, when a colored material is used for the charge controlling agent, the toner may show different tones of color and, therefore, colorless materials or materials close to white are preferably used. Examples of charge controlling agents include nigrosine dyes, triphenylmethane dyes, chrome containing metal complex dyes, molybdic acid chelate pigments, rhodamine dyes, alkoxy amines, quaternary ammonium salts (including fluoride-modified quaternary ammonium salts), alkylamides, phosphous or compounds thereof, tungsten or compounds thereof, fluorine-containing surfactants, metal salts of salicylic acid, and metal salts of salicylic acid derivatives. In addition, the metals can be appropriately selected depending on the intended purpose. Examples of the metals include aluminum, zinc, titanium, strontium, boron, silicon, nickel, iron, chrome, and zirconium.

For the charge controlling agent, commercially available products may be used. Examples thereof include Bontron P-51 of a quaternary ammonium salt, Bontron E-82 of an oxynaphthoic acid metal complex, Bontron E-84 of a salicylic acid metal complex, and Bontron E-89 of a phenol condensate (produced by Orient Chemical Industries, Ltd.); TP-302 and TP-415, both are a quaternary ammonium salt molybdenum metal complex (produced by Hodogaya Chemical Co.); Copy Charge PSY VP2038, and Copy Charge NEG VP2036 and Copy Charge NX VP434, those are quaternary ammonium salts, Copy Blue PR of a triphenylmethane derivative (produced by Hoechst Ltd.); LRA-901, and LR-147 of a boron metal complex (produced by Japan Carlit Co., Ltd.); quinacridones; azo pigments; and high-molecular mass compounds having sulfonic acid, carboxylic acid and a quaternary ammonium salt.

The content of the charge controlling agent in the toner can be appropriately determined depending on kinds of the binder resins, kinds of the additives, and dispersing methods, and the charge controlling agent is preferably added in an amount of 0.1 parts by mass to 10 parts by mass based on 100 parts by mass of the resin particles and, more preferably 1 part by mass to 5 parts by mass. If less than 0.1 parts by mass is used, it may result in poor toner charging ability. If greater than 10 parts by mass is used, the charging properties of toner becomes exceedingly enhanced, resulting in reducing the effect of the charge controlling agent primarily used, and an electrostatic suction force that presses toner against developing rollers increases. Thus, it may cause reduction in the flowability of the developer and in image density.

The flowability improver is an agent that improves hydrophobic properties of toner through surface treatment and is capable of preventing reduction of the flowability and charging ability under high humidity. Examples thereof include silane coupling agents, sililating agents, silane coupling agents bearing a fluorinated alkyl group, organotitanate coupling agents, aluminum-based coupling agents, silicone oils, and modified silicone oils.

The cleaning improver is added to the toner to remove a developer remaining on a photoconductor and on a primary transferring member after a transferring step. Examples thereof include fatty acid metal salts such as zinc stearate, calcium stearate, stearic acid, and resin particles prepared by soap-free emulsion polymerization such as polymethylmethacrylate particles and polystyrene particles. Among these, polymer particles with a relatively narrow particle size distribution are preferable, and polymer particles with a mass-average particle diameter of 0.01 μm to 1 μm are more preferable.

Examples of the method of adding the above additives include a method of adding in the polymerization step, a method of adding in the polymerization step after melting and kneading with a master batch, and a method of fixing an additive on a surface of a binder resin after the polymerization step.

The shape, size, and several features of the toner are not particularly limited and can be appropriately determined depending on the intended purpose. The toner preferably offers the following image density, average circularity, mass-average particle diameter, ratio of mass-average particle diameter to number-average particle diameter (mass-average particle diameter/number-average particle diameter), etc.

The image density is preferably 1.90 or more, more preferably 2.00 or more, and most preferably 2.10 or more, as determined using a spectrometer (X-Rite 938 SpectroDensitometer).

If the image density is less than 1.90, it results in low image density and thus high quality images may not be obtained.

The image density can be measured as follow: a solid image with a deposited developer amount of 1.00±0.05 $mg/cm^2$ is formed on a copy sheet (Type 6000<70W>, Ricoh Company, Ltd.) using Imagio Neo 450 (Ricoh Company, Ltd.) having a fixing roller whose surface temperature is set to 160±2° C. Subsequently, the image densities of 6 randomly chosen points are measured using a spectrometer (X-Rite 938 SpectroDensitometer), followed by calculation of the mean of the measured values.

The average circularity is a measure obtained by dividing the circumference of a circle that has the same area as an actual projected area of a toner particle by the circumference of that toner particle, and is preferably 0.900 to 0.980, and more preferably 0.950 to 0.975. Note that it is preferable that the proportion of particles having the is average circularity of less than 0.940 be 15% or less of the total particles.

If the average circularity is less than 0.900, it may result in poor transfer properties and toner dust-free high quality images may not be obtained. If the average circularity is greater than 0.980, it becomes likely that cleaning failures occur on the photoconductor and transfer belt in an image-forming system equipped with a cleaning blade, causing smears on images. For example, in a case of formation of an image that occupies a large area of a sheet (e.g., photographic images), background smears may occur, because, when paper feed failure or the like occurs, toner particles that have been used to develop the image remains unremoved and accumulates on the photoconductor, or, in that case, a charging roller which provides charges to the photoconductor becomes soiled by residual toner particles and thus its original charging ability may be impaired.

The average circularity can be measured using a flow particle image analyzer (e.g., FPIA-2000, produced by Sysmex Corp.) Measurements are made in the following manner. Tiny dusts in water are first moved by filtration so that the number of particles to be measured (e.g., circle equivalent diameter of 0.60 μm to less than 159.21 μm) is 20 or less per $10^{-3}$ cm$^3$, followed by addition of a few droplets of nonionic surfactant (preferably "Contaminon" produced by Wako Pure Chemical Industries, Ltd.) and 5 mg of sample to 10 ml of the water. The mixture is then homogenized using a distributed machine (UH-50, produced by SMT Co., Ltd.) for 1 minute at 20 kHz and 50 W/10 cm$^3$. Homogenization continues for a further 5 minutes, preparing a sample solution with a particle concentration of 4,000/$10^{-3}$ cm$^3$ to 8,000/$10^{-3}$ cm$^3$ (particles with a circle equivalent diameter of 0.60 μm to less than 159.21 μm). The particle size distribution of these particles is then determined as follows.

The sample solution is allowed to flow through a flat, transparent flow cell (thickness: about 200 μm) that extends in the flow direction. A flash lamp and a CCD camera are arranged on opposite sides of the flow cell to establish an optical path that crosses the flow cell. While the sample solution is running, a strobe light flashes at 1/30-second intervals to obtain a 2D image of each particle in the flow cell at a parallel range. By calculating the diameter of a circle that has the same area as the 2D image, the circle equivalent diameter of the particle is determined.

The circle equivalent diameters of 1,200 or more particles can be determined in about 1 minute, and the number and proportion (number-based %) of particles with a specified circle equivalent diameter can be determined on the basis of the circle equivalent diameter distribution. Measurement results (frequency % and accumulation %) can be obtained by dividing a particle size range (0.06 μm to 400 μm) into 226 channels (30 channels per octave). In actual measurements, particles with a circle equivalent diameter of 0.60 μm to less than 159.21 μm are subjected to measurements, The mass-average particle diameter of the toner is not particularly limited and can be appropriately determined depending on the intended purpose. The mass-average particle diameter is preferably 3 μm to 10 μm, and more preferably 3 μm to 8 μm.

If the mass-average particle diameter is less than 3 μm, in a case of two-component developer, toner may fuse to the carrier surface to reduce its charging properties as a result of a long-time agitation in a developing unit, and in a case of a one-component developer, toner filming may occur at a developing roller or toner may more likely to fuse to members such as blade because of its reduced layer thickness. If the mass-average particle diameter is greater than 10 μm, it becomes difficult to obtain images of high resolution and high quality, and the variations in the toner particle diameter may be large when new toner is added to the developer to compensate the consumed toner.

The ratio of mass-average particle diameter to number-average particle diameter in the toner (mass-average particle diameter/number-average particle diameter) is preferably 1.00 to 1.25, and more preferably 1.00 to 1.10.

If this ratio exceeds 1.25, in a case of two-component developer, toner may fuse to the carrier surface to reduce its charging properties as a result of a long-time agitation in the developing unit, and in a case of a one-component developer, toner filming may occur at the developing roller or toner may more likely to fuse to members such as blades because of its reduced layer thickness. In addition, it becomes difficult to obtain images of high resolution and high quality, and the variations in toner particle diameter may be large when toner is added to the developer to compensate the consumed toner.

The mass-average particle diameter and the ratio of mass-average particle diameter to number-average particle diameter can be determined using, for example, Coulter Counter TA-II, a particle size analyzer manufactured by Beckmann Coulter Inc.

<Developer>

The developer used in the present invention contains the toner of the present invention and appropriately selected additional ingredients such as a carrier. The developer may be either a one-component or a two-component developer; however, when it is applied to high-speed printers that support increasing information processing rates of recent years, a two-component developer is preferable in view of achieving an excellent shelf life.

In the case of a one-component developer containing the toner of the present invention, the variations in the toner particle diameter are minimized even after consumption or addition of toner, and toner filming to a developing roller and toner adhesion to members such as blade to reduce layer thickness of the toner are prevented. Thus, it is possible to provide excellent and stable developing properties and images even after a long time usage of the developing unit, i.e. after long time agitation of developer. Meanwhile, in the case of a two-component developer containing the toner of the present invention, even after many cycles of consumption and addition of toner, the variations in the toner particle diameter are minimized and, even after a long time agitation of the developer in the developing unit, excellent and stable developing properties may be obtained.

—Carrier—

The carrier is not particularly limited and can be appropriately selected depending on the intended purpose. However, the carrier may be preferably selected from those having a core material and a resin layer coating the core material.

The material for the core is not particularly limited and can be appropriately selected from conventional materials, for example, materials based on manganese-strontium (Mn—Sr) of 50 emu/g to 90 emu/g and materials based on manganese-magnesium (Mn—Mg) are preferable. From the standpoint of securing image density, high magnetizing materials such as iron powder (100 emu/g or more) and magnetite (75 emu/g to 120 emu/g) are preferable. In addition, weak magnetizing materials such as copper-zinc (Cu—Zn)-based materials (30 emu/g to 80 emu/g) are preferable from the standpoint for achieving higher-grade images by reducing the contact pressure against the photoconductor having standing toner particles. These materials may be used singly or in combination.

The particle diameter of the core material, in terms of volume-average particle diameter, is preferably 10 μm to 150 μm, and more preferably 40 μm to 100 μm.

If the average particle diameter (volume-average particle diameter ($D_{50}$)) is less than 10 μm, fine particles make up a large proportion of the carrier particle distribution, causing carrier scattering due to reduced magnetization per one particle in some cases, on the other hand, if it exceeds 150 μm, the specific surface area of the particle decreases, causing toner scatterings and reducing the reproducibility of images, particularly the reproducibility of solid images in full-color images due to many solid images in full-color images.

Materials for the resin layer are not particularly limited and can be appropriately selected from those known in the art depending on the intended purpose. Examples thereof include amino resins, polyvinyl resins, polystyrene resins, halogenated olefin resins, polyester resins, polycarbonate resins, polyethylene resins, polyvinyl fluoride resins, polyvinylidene fluoride resins, polytrifluoroethylene resins, polyhexafluoropropylene resins, copolymers of vinylidene fluoride and acrylic monomers, copolymers of vinylidene fluoride and vinyl fluoride, fluoroterpolymers such as terpolymers of tetrafluoroethylene, vinylidene fluoride and non-fluoride monomers, and silicone resins. These resins may be used singly or in combination.

Examples of the amino resins include urea-formaldehyde resins, melamine resins, benzoguanamine resins, urea resins, polyamide resins, and epoxy resins. Examples of the polyvinyl resins include acrylic resins, polymethyl methacrylate resins, polyacrylonitrile resins, polyvinyl acetate resins, polyvinyl alcohol resins, and polyvinyl butyral resins. Examples of the polystyrene resins include polystyrene resins, and styrene-acryl copolymer resins. Examples of the halogenated olefin resins include polyvinyl chloride. Examples of the polyester resins include polyethylene terephthalate resins, and polybutylene terephthalate resins.

The resin layer may contain such material as conductive powder depending on the application. Examples of the conductive powder include metal powder, carbon black, titanium oxide, tin oxide and zinc oxide. These conductive powders preferably have an average particle diameter of 1 µm or less. If the average particle diameter is greater than 1 µm, it may be difficult to control electrical resistance.

The resin layer may be formed by dissolving the silicone resin or the like into a solvent to prepare a coating solution, uniformly coating the surface of the core material with the coating solution by a known coating process, and drying and baking the core material. Examples of the coating process include immersing process, spray process, and brush painting process.

The solvent is not particularly limited and can be appropriately selected depending on the intended purpose. Examples thereof include toluene, xylene, methyl ethyl ketone, methyl isobutyl ketone, cellosolve, and butylacetate.

The baking process is not particularly limited and may be an externally heating process or an internally heating process, and can be selected from, for example, a process using a fixed type electric furnace, a fluid type electric furnace, a rotary type electric furnace or a burner furnace, and a process using microwave and the like.

The content of the resin layer in the carrier is preferably 0.01% by mass to 5.0% by mass. If the content is less than 0.01% by mass, it may be difficult to form a uniform resin layer on the surface of the core material, on the other hand, if the content exceeds 5.0% by mass, the resin layer becomes so thick that carrier particles may associate together. Thus, it may result in failure to obtain uniform carrier particles.

When the developer is a two-component developer, the content of the carrier in the two-component developer is not particularly limited and can be appropriately determined depending on the intended purpose, for example, it is preferably 90% by mass to 98% by mass, and more preferably 93% by mass to 97% by mass.

Since the developer contains the toner of the present invention, it offers excellent charging properties upon formation of an image and can realize stable formation of high-quality images.

The developer can be suitably applied to a variety of known electrophotographic image-forming processes including a magnetic one-component developing process, non-magnetic one-component developing process, and two-component developing process, particularly to a toner container, process cartridge, image-forming apparatus used in the present invention and image-forming method of the present invention, all of which will be described below.

<Toner Container>

The toner container used in the present invention is a container supplied with the toner of the present invention or the developer containing the toner of the present invention.

The toner container is not particularly limited and can be appropriately selected from conventional containers, for example, a toner container having a container main body and a cap is a suitable example.

The size, shape, structure, material and several features of the container main body is not particularly limited and can be appropriately determined depending on the intended purpose. For example, the container main body may preferably have a cylindrical shape, and most preferably a cylindrical shape in which spiral grooves are formed on its inner surface that allow toner in the container to shift to the outlet along with rotation of the main body, and in which all or part of the spiral grooves have a bellow function.

Materials for the container main body are not particularly limited and may be preferably those capable of providing accurate dimensions when fabricated and examples include resins. For example, polyester resins, polyethylene resins, polypropylene resins, polystyrene resins, polyvinyl chloride resins, polyacrylic acid resins, polycarbonate resins, ABS resins, and polyacetal resins are suitable examples.

The toner container can be readily stored and transferred, and is easy to handle. The toner container can be suitably used to supply toner by detachably attaching it to a process cartridge, image-forming apparatus or the like to be described later.

<Process Cartridge>

The process cartridge used in the present invention contains a latent electrostatic image bearing member configured to bear a latent electrostatic image, and a developing unit configured to develop the latent electrostatic image formed on the latent electrostatic image bearing member using a toner to thereby form a visible image, and further contains additional units appropriately selected.

The process cartridge is detachably attached to the image-forming apparatus and excellent in convenience.

The developing unit contains a developer storing container for storing the toner of the present invention or the developer, and a developer carrier for carrying and transferring the toner or developer stored in the developer container, and may further contains a layer-thickness control member for controlling the thickness of the layer of toner to be carried.

Figure 2:
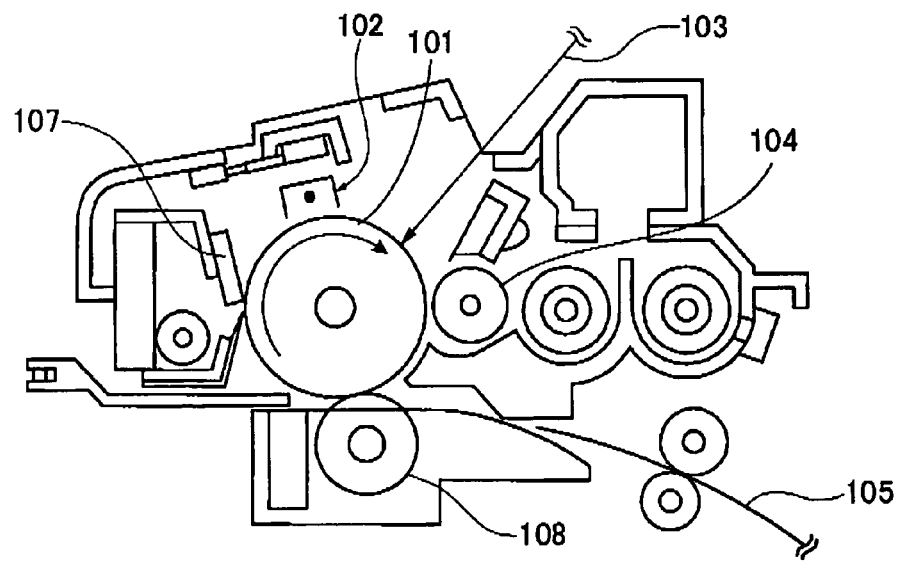
FIG. 2 is a schematic view of an example of a process cartridge.

The process cartridge contains, for example, as shown in FIG. 2, latent electrostatic image bearing member 101 mounted in, charging unit 102, developing unit 104, transferring unit 108, and cleaning unit 107 and, if necessary, further contains additional units. In FIG. 2, 103 denotes exposure light by means of an exposing unit, and 105 denotes a recording medium.

Next, an image-forming process by means of the process cartridge shown in FIG. 2 will be described. The latent electrostatic image bearing member 101 rotates in the arrow direction, charged by means of the charging unit 102 and is exposed with the exposure light 103 by means of an exposing unit (not shown), whereby a latent electrostatic image corresponding to the exposed image is formed thereon. This electrostatic image is developed by means of the developing unit 104, and the resultant visible image is transferred to the recording medium 105 by means of the transferring unit 108. The recording medium 105 is then printed out. Subsequently, after transferring the image, the surface of the latent electrostatic image bearing member 101 is cleaned by means of the cleaning unit 107, and charges are removed by means of a charge-eliminating unit (not shown). This whole process is continuously repeated.

<Image-Forming Method and Image-Forming Apparatus>

The image-forming method of the present invention contains at least a latent electrostatic image-forming step, a developing step, a transferring step and a fixing step, and further contains additional steps such as a charge eliminating step, a cleaning step, a recycling step and a controlling step, which are optionally selected as needed.

The image-forming apparatus used in the present invention contains an latent electrostatic image bearing member, a latent electrostatic image-forming unit, a developing unit, a transferring unit and a fixing unit, and further contains additional units such as a charge eliminating unit, a cleaning unit, a recycling unit and a controlling unit, which are optionally selected as needed.

The latent electrostatic image-forming step is a step of forming a latent electrostatic image on a latent electrostatic image bearing member.

The material, shape, size, structure, and several features of the latent electrostatic image bearing member are not particularly limited. The latent electrostatic image bearing member can be appropriately selected from those known in the art. However, a drum shaped-latent electrostatic image bearing member is a suitable example. For the material constituting the latent electrostatic image bearing member, inorganic photoconductive materials such as amorphous silicon and selenium, and organic photoconductive materials such as polysilane and phthalopolymethine are preferable. Among these, amorphous silicon is preferable in view of its long life.

The formation of the latent electrostatic image is achieved by, for example, exposing the latent electrostatic image bearing member imagewisely after equally charging its entire surface. This step is performed by means of the latent electrostatic image-forming unit. The latent electrostatic image-forming unit contains a charging device configured to equally charge the surface of the latent electrostatic image bearing member, and an exposing device configured to expose imagewisely the surface of the latent electrostatic image bearing member.

The charging step is achieved by, for example, applying voltage to the surface of the latent electrostatic image bearing member by means of the charging device.

The charging device is not particularly limited and can be appropriately selected depending on the intended purpose, examples include known contact-charging devices equipped with a conductive or semiconductive roller, blush, film or rubber blade, and known non-contact-charging devices utilizing corona discharge such as corotron or scorotoron.

The exposing step is achieved by, for example, exposing the surface of the photoconductor imagewisely by means of an exposing unit.

The exposing device is not particularly limited as long as it is capable of performing imagewise exposure on the surface of the charged latent electrostatic image bearing member by means of the charging device, and may be appropriately selected depending on the intended use. Examples thereof include various exposing devices, such as optical copy devices, rod-lens-eye devices, optical laser devices, and optical liquid crystal shatter devices.

Note in the present invention that a backlight system may be employed for exposure, where imagewise exposure is performed from the back side of the latent electrostatic image bearing member.

—Developing and Developing Unit—

The developing step is a step of developing the latent electrostatic image using the toner of the present invention or developer to form a visible image.

The formation of the visible image can be achieved, for example, by developing the latent electrostatic image using the toner of the present invention or the developer. This is performed by means of the developing unit.

The developing unit is not particularly limited as long as it is capable of performing developing by means of the toner of the present invention or the developer, and can be appropriately selected from known developing units depending on the intended purpose. Suitable examples include those having at least a developing device, which is capable of housing the toner of the present invention or the developer therein and is capable of directly or indirectly applying the toner or developer to the latent electrostatic image. A developing device equipped with the toner container is more preferable.

The developing device may be of dry developing type or wet developing type, and may be designed either for monochrome or multiple-color. Suitable examples include those having an agitation unit for agitating the toner or developer to provide electrical charges by frictional electrification, and a rotatable magnetic roller.

In the developing device the toner and carrier are mixed together and the toner is charged by friction, allowing the rotating magnetic roller to bear toner particles in such a way that they stand on its surface. In this way a magnetic blush is formed. Since the magnetic roller is arranged in the vicinity of the latent electrostatic image bearing member (photoconductor), some toner particles on the magnetic roller that constitute the magnetic blush electrically migrate to the surface of the latent electrostatic image bearing member (photoconductor). As a result, a latent electrostatic image is developed by means of the toner, forming a visible image on the surface of the latent electrostatic image bearing member (photoconductor).

The developer contained in the developing device is a developer containing the toner of the present invention. The developer may be either a one-component developer or a two component developer, The toner contained in the developer is the toner of the present invention.

—Transferring and Transferring Unit—

The transferring step is a step of transferring the visible image onto a recording medium. A preferred embodiment of transferring involves two steps: primary transferring in which the visible image is transferred onto an intermediate transferring medium, and secondary transferring in which the visible image transferred onto the intermediate transferring medium is transferred onto a recording medium. A more preferable embodiment of transferring involves two steps: primary transferring in which a visible image is transferred onto an intermediate transferring medium to form a complex image thereon by means of toners of two or more different colors, preferably full-color toners; and secondary transferring in which the complex image is transferred onto a recording medium.

The transferring step is achieved by, for example, charging the latent electrostatic image bearing member (photoconductor) by means of a transfer charging unit, This transferring step is performed by means of the transferring unit. A preferable embodiment of the transferring unit has two units: a primary transferring unit configured to transfer a visible image onto an intermediate transferring medium to form a complex image; and a secondary transferring unit configured to transfer the complex image onto a recording medium.

The intermediate transferring medium is not particularly limited and can be selected from conventional transferring media depending on the intended purpose; suitable examples include transferring belts.

The transferring unit (i.e., the primary and secondary transferring steps) preferably contains a transferring device configured to charge and separate the visible image from the latent electrostatic image bearing member (photoconductor) and transfer it onto the recording medium. The number of the transferring step to be provided may be either 1 or more.

Examples of the transferring devices include corona transferring devices utilizing corona discharge, transferring belts, transferring rollers, pressure-transferring rollers, and adhesion-transferring devices.

The recording medium is not particularly limited and can be appropriately selected from known recording media (recording sheets).

The fixing step is a step of fixing a transferred visible image onto a recording medium by means of the fixing unit. Fixing may be performed every time after each color toner has been transferred to the recording medium or may be performed in a single step after all different toners have been transferred to the recording medium.

The fixing device is not particularly limited and can be appropriately selected depending on the intended purpose. Examples include a heating-pressurizing unit. The heating-pressurizing unit is preferably a combination of a heating roller and a pressurizing roller, or a combination of a heating roller, a pressurizing roller, and an endless belt, for example.

In general, heating treatment by means of the heating-pressurizing unit is preferably performed at a temperature of 80° C. to 200° C.

Note in the present invention that a known optical fixing unit may be used in combination with or instead of the fixing step and fixing unit, depending on the intended purpose.

The charge eliminating step is a step of applying a bias to the charged latent electrostatic image bearing member for elimination of charges. This is suitably performed by means of the charge eliminating unit.

The charge eliminating unit is not particularly limited as long as it is capable of applying a charge eliminating bias to the latent electrostatic image bearing member, and can be appropriately selected from known charge eliminating units depending on the intended purpose, A suitable example thereof is a charge eliminating lamp and the like.

The cleaning step is a step of removing toner particles remained on the latent electrostatic image bearing member. This is suitably performed by means of the cleaning unit. The cleaning unit is not particularly limited as long as it is capable of eliminating such toner particles from the latent electrostatic image bearing member, and can be suitably selected from known cleaners depending on the intended use. Examples thereof include a magnetic blush cleaner, an electrostatic brush cleaner, a magnetic roller cleaner, a blade cleaner, a blush cleaner, and a wave cleaner The recycling step is a step of recycling the toner particles removed through the cleaning step to the developing unit. This is suitably performed by means of the recycling unit.

The recycling unit is not particularly limited and can be appropriately selected from conventional conveyance systems.

The controlling step is a step of controlling the foregoing steps. This is suitably performed by means of the controlling unit.

The controlling unit is not particularly limited as long as the operation of each step can be controlled, and can be appropriately selected depending on the intended use. Examples thereof include equipment such as sequencers and computers.

One embodiment of the image-forming method of the present invention by means of the image-forming apparatus will be described with reference to FIG. 3. Image-forming apparatus 100 shown in FIG. 3 contains a photoconductor drum 10 (hereinafter referred to as "photoconductor 10") as the latent electrostatic image bearing member, a charging roller 20 as the charging unit, an exposure device 30 as the exposing unit, a developing device 40 as the developing unit, an intermediate transferring member 50, a cleaning device 60 as the cleaning unit having a cleaning blade, and a charge eliminating lamp 70 as the charge eliminating unit.

Intermediate transferring member 50 is an endless belt, and is so designed that it loops around three rollers 51 disposed its inside and rotates in the direction shown by the arrow by means of rollers 51. One or more of three rollers 51 also functions as a transfer bias roller capable of applying a certain transfer bias (primary bias) to the intermediate transferring member 50. Cleaning blade 90 is provided adjacent to the intermediate transferring member 50. There is provided a transferring roller 80 facing to the intermediate transferring member 50 as the transferring unit capable of applying a transfer bias so as to transfer a developed image (toner image) to a transfer sheet 95 as a recording medium (secondary transferring). Moreover, there is provided a corona charger 58 around the intermediate transferring member 50 for applying charges to the toner image transferred on the intermediate transferring medium 50. Corona charger 58 is arranged between the contact region of the photoconductor 10 and the intermediate transferring medium 50 and the contact region of the intermediate transferring medium 50 and the transfer sheet 95, in the rotational direction of the intermediate transferring medium 50.

Developing device 40 contains a developing belt 41 as a developer bearing member, a black developing unit 45K, a yellow developing unit 45Y, a magenta developing unit 45M and a cyan developing unit 45C, these developing units being positioned around the developing belt 41, The black developing unit 45K contains a developer container 42K, a developer supplying roller 43K, and a developing roller 44K. The yellow developing unit 45Y contains a developer container 42Y, a developer supplying roller 43Y, and a developing roller 44Y. The magenta developing unit 45M contains a developer container 42M, a developer supplying roller 43M, and a developing roller 44M. The cyan developing unit 45C contains a developer container 42C, a developer supplying roller 43C, and a developing roller 44C. The developing belt 41 is an endless belt looped around a plurality of belt rollers so as to be rotatable. A part of the developing belt 41 is in contact with the photoconductor 10.

Figure 3:
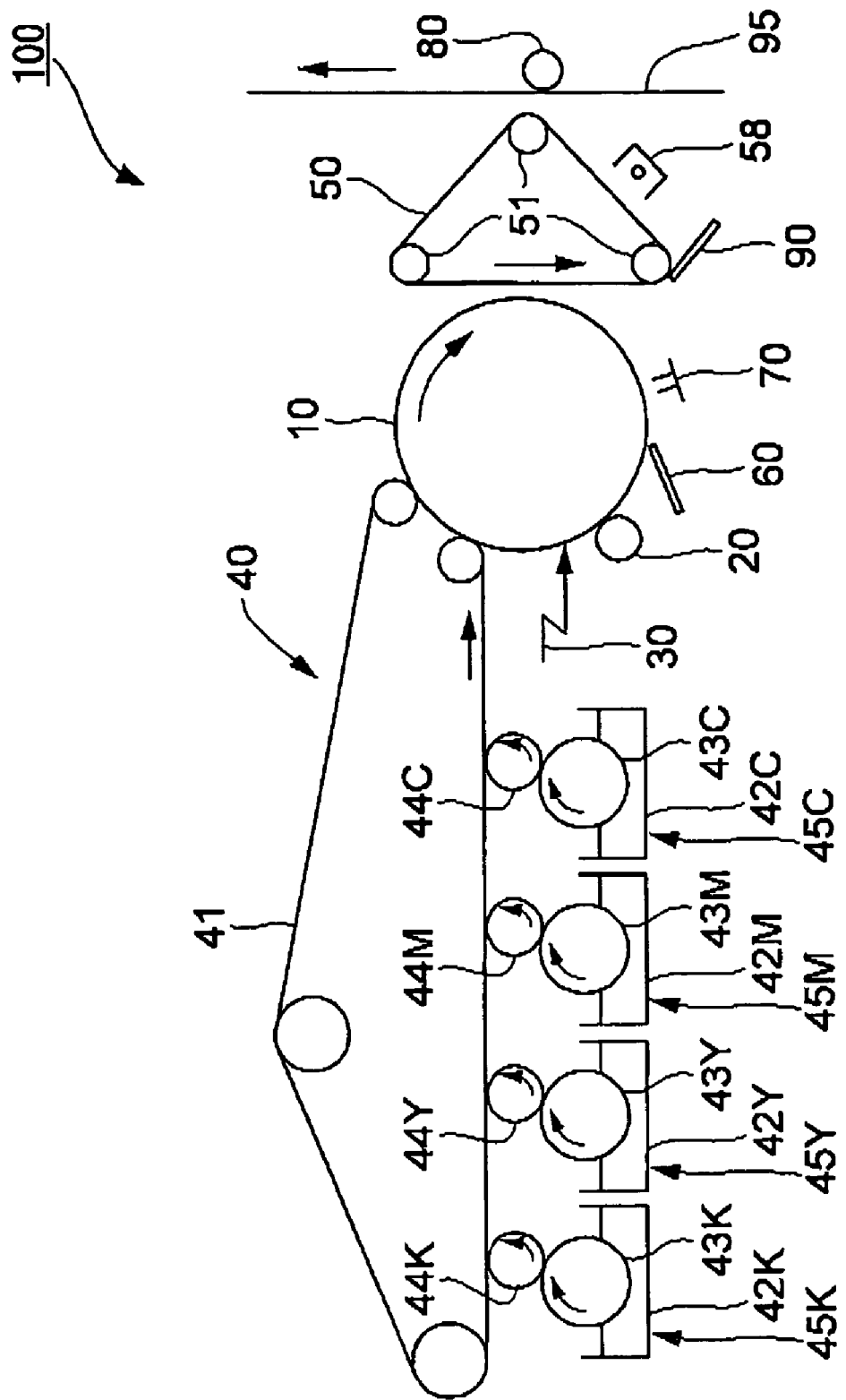
FIG. 3 is a schematic view of an example of an image-forming apparatus which is used in the image-forming method of the present invention.

In image-forming apparatus 100 shown in FIG. 3, the photoconductor drum 10 is uniformly charged by means of, for example, the charging roller 20. The exposure device 30 then exposes imagewisely on the photoconductor drum 10 so as to form a latent electrostatic image The latent electrostatic image formed on the photoconductor drum 10 is provided with toner from the developing device 40 to form a visible image (toner image). The roller 51 applies a bias to the toner image to transfer the visible image (toner image) onto the intermediate transferring medium 50 (primary transferring), and further applies a bias to transfer the toner image from the intermediate transferring medium 50 to the transfer sheet 95 (secondary transferring). In this way a transferred image is formed on the transfer sheet 95. Thereafter, toner particles remained on the photoconductor drum 10 are removed by means of the cleaning device 60, and charges of the photoconductor drum 10 are removed by means of a charge eliminating lamp 70 on a temporary basis.

Figure 4:
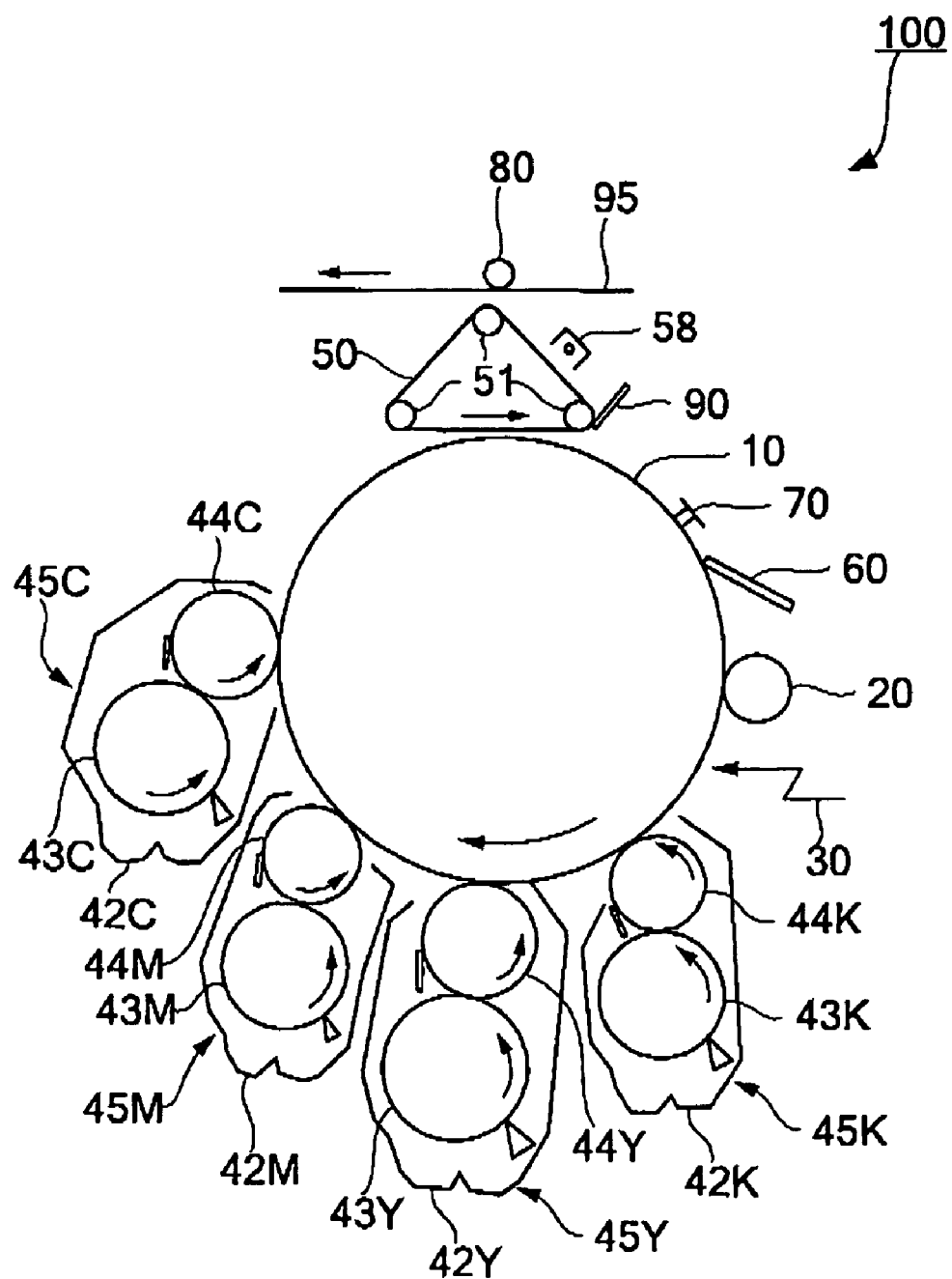
FIG. 4 is a schematic view of another example of an image-forming apparatus which is used in the image forming-method of the present invention.

Another embodiment of the image-forming method of the present invention by means of the image-forming apparatus will be described with reference to FIG. 4. The image-forming apparatus 100 shown in FIG. 4 has an identical configuration and working effects to those of the image-forming apparatus 100 shown in FIG. 3 except that this image-forming apparatus 100 does not contains the developing belt 41 and that the black developing unit 45K, yellow developing unit 45Y, magenta developing unit 45M and cyan developing unit 45C are disposed so as to face the photoconductor 10. Note in FIG. 4 that members identical to those in FIG. 3 are denoted by the same reference numerals.

Figure 5:
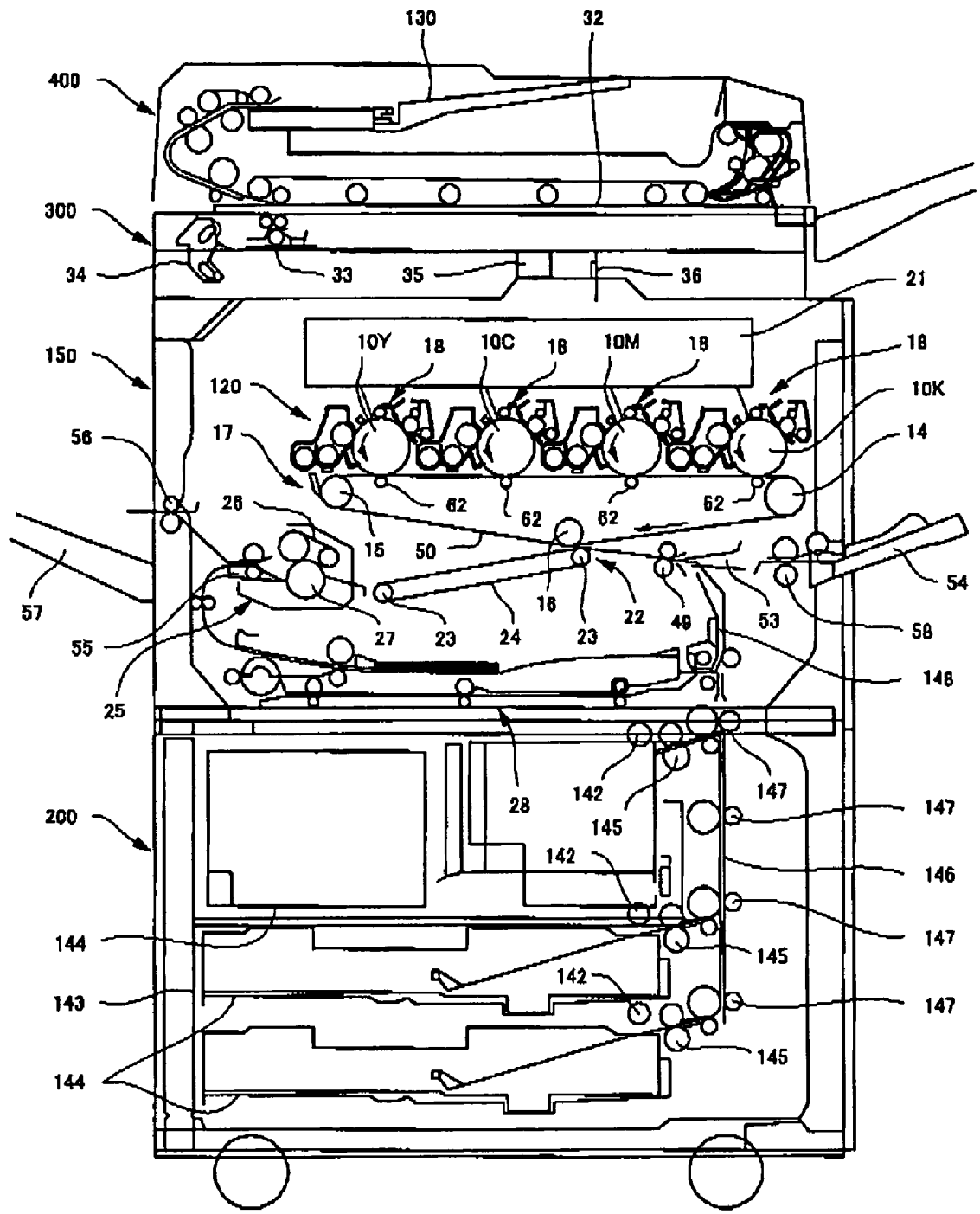
FIG. 5 is a schematic view of an example of an image forming apparatus, a tandem color image-forming apparatus, which is used in the image-forming method of the present invention.

Still another embodiment of the image-forming method of the present invention by means of the image-forming apparatus will be described with reference to FIG. 5. Image-forming apparatus 100 shown in FIG. 5 is a tandem color image-forming apparatus. The tandem image-forming apparatus contains a copy machine main body 150, feeder table 200, scanner 300, and automatic document feeder (ADF) 400.

The copy machine main body 150 has an endless-belt intermediate transferring member 50 in the center. The intermediate transferring member 50 is looped around support rollers 14, 15 and 16 and is configured to be rotatable in a clockwise direction in FIG. 5. A cleaning device for intermediate transferring member 17 for the intermediate transferring member is provided in the vicinity of the support roller 15. The cleaning device for intermediate transferring member 17 removes toner particles remained on the intermediate transferring member 50. On the intermediate transferring member 50 looped around the support rollers 14 and 15, four color-image-forming devices 18—yellow, cyan, magenta, and black—are aligned along the conveying direction so as to face the intermediate transferring member 50, which constitutes a tandem developing unit 120. An exposing unit 21 is arranged adjacent to the tandem developing unit 120. A secondary transferring unit 22 is arranged across the intermediate transferring member 50 from the tandem developing unit 120. The secondary transferring unit 22 contains a secondary transferring belt 24, which is an endless belt and looped around a pair of rollers 23. A transferred sheet which is conveyed on the secondary transferring belt 24 is allowed to contact the intermediate transferring member 60. An image fixing unit 25 is arranged in the vicinity of the secondary. transferring unit 22. The image fixing unit 25 contains a fixing belt 26 which is an endless belt, and a pressurizing roller 27 which is pressed by the fixing belt 26.

In the tandem image-forming apparatus, a sheet reverser 28 is arranged adjacent to both the secondary transferring unit 22 and image fixing unit 25. A sheet reverser 28 turns over a transferred sheet to form images on the both sides of the sheet.

Next, full-color image formation (color copying) using a tandem developing unit 120 will be described. At first, a source document is placed on a document tray 130 of an automatic document feeder 400. Alternatively, the automatic document feeder 400 is opened, the source document is placed on a contact glass 32 of a scanner 300, and the automatic document feeder 400 is closed.

When a start switch (not shown) is pushed, the source document placed on the automatic document feeder 400 is transferred onto the contact glass 32, and the scanner 300 is then driven to operate first and second carriages 33 and 34. In a case where the source document is originally placed on the contact glass 32, the scanner 300 is immediately driven after pushing of the start switch. Light is applied from a light source to the document by means of the first carriage 33, and light reflected from the document is further reflected by the mirror of the second carriage 34. The reflected light passes through the image-forming lens 35, and read the sensor 36 receives it. In this way the color document (color image) is scanned, producing 4 types of color image information—black, yellow, magenta, and cyan.

Figure 6:
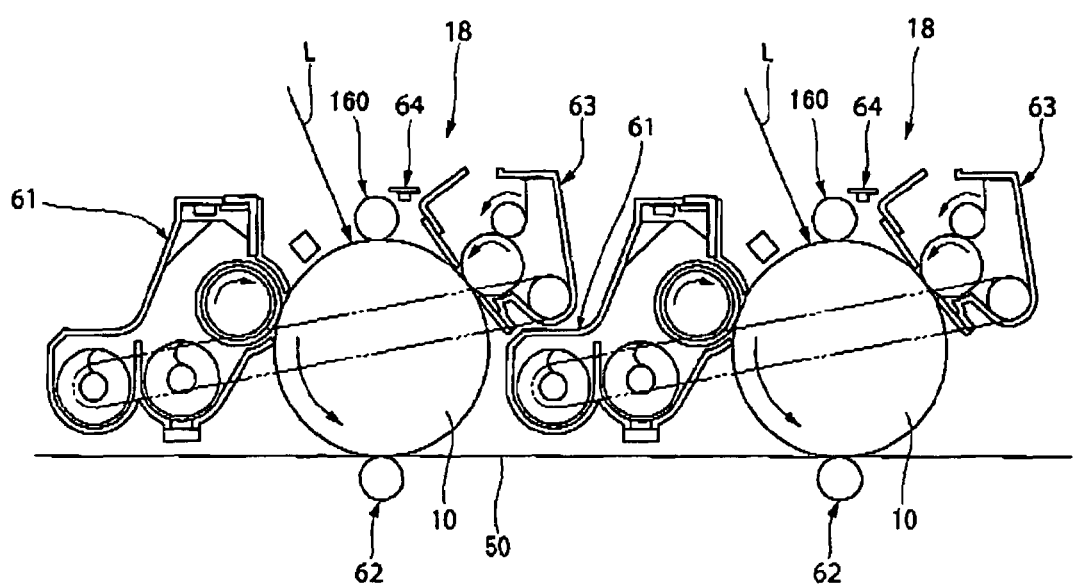
FIG. 6 is a partially enlarged schematic view of the image-forming apparatus shown in FIG. 5.

Each image information of black, yellow, magenta, and cyan is transmitted to an image-forming unit 18 (black image-forming unit, yellow image-forming unit, magenta image-forming unit, or cyan image-forming unit) of the tandem developing unit 120, and toner images of each color are formed in each image-forming unit 18. As shown in FIG. 6, each image-forming unit 18 (black image-forming unit, yellow image-forming unit, magenta image-forming unit, and cyan image-forming unit) of the tandem developing unit 120 contains: a photoconductor 10 (photoconductor for black 10K, photoconductor for yellow 10Y, photoconductor for magenta 10M, or photoconductor for cyan 10C); a charging device 160 for uniformly charging the photoconductor 10; an exposing unit for forming a latent electrostatic image corresponding to the color image on the photoconductor by exposing imagewisely (denoted by "L" in FIG. 6) on the basis of the corresponding color image information; a developing device 61 for developing the latent electrostatic image using the corresponding color toner (black toner, yellow toner, magenta toner, or cyan toner) to form a toner image; a transfer charger 62 for transferring the toner image to an intermediate transferring member 60, a cleaning device 63, and a charge eliminating device 64. Thus, images of one color (a black image, a yellow image, a magenta image, and a cyan image) can be formed based on the color image information. The black toner image formed on the photoconductor for black 10K, yellow toner image formed on the photoconductor for yellow 10Y, magenta toner image formed on the photoconductor for magenta 10M, and cyan toner image formed on the photoconductor for cyan 10C are sequentially transferred onto the intermediate transferring member 50 which rotates by means of support rollers 14, 15 and 16 (primary transferring). These toner images are superimposed on the intermediate transferring member 50 to form a composite color image (color transferred image).

Meanwhile, one of feed rollers 142 of the feed table 200 is selected and rotated, whereby sheets (recording sheets) are ejected from one of multiple feed cassettes 144 in a paper bank 143 and are separated one by one by a separation roller 145. Thereafter, the sheets are fed to feed path 146, transferred by a transfer roller 147 into a feed path 148 inside the copying machine main body 150, and are bumped against the resist roller 49 to stop. Alternatively, one of the feed rollers 142 is rotated to eject sheets (recording sheets) placed on a manual feed tray 54. The sheets are then separated one by one by means of the separation roller 145, fed into a manual feed path 53, and similarly, bumped against the resist roller 49 to stop. Note that the resist roller 49 is generally earthed, but it may be biased for removing paper dusts on the sheets. The resist roller 49 is rotated synchronously with the movement of the composite color image (color transferred image) on the intermediate transferring member 50 to transfer the sheet (recording sheet) into between the intermediate transferring member 50 and the secondary transferring unit 22, and the composite color image (color transferred image) is transferred onto the sheet by means of the secondary transferring unit 22 (secondary transferring). In this way the color image is formed on the sheet (recording sheet). Note that after image transferring, toner particles remained on the intermediate transferring member 50 are cleaned by means of the cleaning device for intermediate transferring member 17.

The sheet (recording sheet) bearing the transferred color image is conveyed by the secondary transferring unit 22 into the image fixing unit 25, where the composite color image (color transferred image) is fixed onto the sheet (recording sheet) by heat and pressure. Thereafter, the sheet changes its direction by action of a switch hook 55, ejected by an ejecting roller 56, and stacked on an output tray 57. Alternatively, the sheet changes its direction by action of the switch hook 55, flipped over by means of the sheet reverser 28, and transferred back to the image transfer section for recording of another image on the other side. The sheet that bears images on both sides is then ejected by means of the ejecting roller 56, and is stacked on the output tray 57.

The image-forming method of the present invention and the image-forming apparatus use the toner of the present invention with a sharp particle size distribution and excellent toner characteristics such as charging properties, environmental impact, and temporal stability. Thus it is possible to form high-quality images.

EXAMPLES

Hereinafter, examples of the present invention will be described, which however shall not be construed as limiting the invention thereto. All parts and percentage (%) are expressed by mass unless indicated otherwise.

Synthesis Example 1

—Synthesis of Fluorine-Containing Surfactant 1—

A pressure-resistant reaction cell (internal volume: 1,000 ml) equipped with a stirrer was charged with 500 parts of 1,1-dihydroperfluorooctylacrylate, and 25 parts of V-65 (2,2'-azobis(2,4-dimethylvaleronitrile) produced by Wako Pure Chemical Industries, Ltd.). Carbon dioxide was selected as a supercritical fluid and supplied from a gas container to the pressure-resistant reaction cell. The cell pressure was controlled to 20 MPa using a pressure pump, and the cell temperature was controlled to 65° C. using a temperature controller, allowing a reaction to take place for 24 hours with agitation. After termination of the reaction, the pressure-resistant reaction cell was cooled to 0° C. and brought to atmospheric pressure using a back pressure valve to obtain "Fluorine-Containing Surfactant 1".

The mass-average molecular mass of the obtained Fluorine-Containing Surfactant 1 was 15,000 as measured by the following conditions.

<Measurement of Mass-Average Molecular Mass of Fluorine-Containing Surfactant>

The sample preparation and the measurement of the mass-average molecular mass of the fluorine-containing surfactant was carried out by GPC (Gel Permeation Chromatography) under the following condition:

—Sample Preparation Method—

HFIP (hexafluoropropanol) solution in which $CF_3COONa$ was adjusted to be 5mM was used, and a sample was dissolved to be the concentrations of 0.15% by mass.

[Measurement Conditions]
Instrument: HLC-8220-GPC (Tosoh Corporation)
Columns: TSK-gel GMH HR-M (Tosoh Corporation)
Temperature: 40° C.
Solvent: HFIP (hexafluoropropanol)
Flow rate: 0.2 ml/min.
Samples: samples with the concentrations of 0.15% by mass (10 µl)

In this way a molecular mass distribution of the fluorine-containing surfactant was obtained, and using a molecular mass calibration curve constructed from monodisperse polystyrene standards, the mass-average molecular mass of the fluorine-containing surfactant was calculated.

Synthesis Example 2

—Synthesis of Fluorine-Containing Surfactant 2—

A pressure-resistant reaction cell (internal volume: 1,000 ml) equipped with a stirrer was charged with 250 parts of 1,1-dihydroperfluorooctylacrylate, 250 parts of styrene, and 2 parts of AIBN (2,2'-azobisisobutyronitrile produced by Wako Pure Chemical Industries, Ltd.). Carbon dioxide was selected as a supercritical fluid and supplied from a gas container to the pressure-resistant reaction cell. The cell pressure was controlled to 30 MPa using a pressure pump, and the cell temperature was controlled to 85° C. using a temperature controller, allowing a reaction to take place for 24 hours. After termination of the reaction, the reaction cell was cooled to 0° C. and brought to atmospheric pressure using a back pressure valve to obtain "Fluorine-Containing Surfactant 2".

The mass-average molecular mass of the obtained Fluorine-Containing Surfactant 2 was 140,000 as measured by the same manner to that described in the Synthesis Example 1.

Synthesis Examples 3 to 13

—Synthesis of Fluorine-Containing Surfactants 3 to 13—

Except that the fluorine-containing monomer and copolymerizable monomer in Table 1 were used in stead of the fluorine-containing monomer and copolymerizable monomer in Synthesis Example 2, Fluorine-Containing Surfactants 3 to 13 (compound examples 3 to 13) were synthesized in the same manner to that described in Synthesis Example 2. The mass-average molecular mass of the obtained Synthesis of Fluorine-Containing Surfactants 3 to 13 measured by the same manner to that described in the Synthesis Example 1 are shown in Table 1.

TABLE 1

| Compound Examples | Fluorine-Containing Monomer (parts by mass) | Copolymerizable Monomer (parts by mass) | Copolymerizable Monomer (parts by mass) | Mass-Average Molecular Mass |
|---|---|---|---|---|
| 1 | 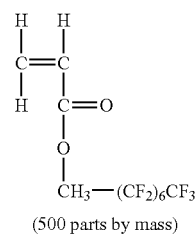<br>(500 parts by mass) | — | — | 15000 |

TABLE 1-continued

| Compound Examples | Fluorine-Containing Monomer (parts by mass) | Copolymerizable Monomer (parts by mass) | Copolymerizable Monomer (parts by mass) | Mass-Average Molecular Mass |
|---|---|---|---|---|
| 2 | $CH_2=CH-COO-CH_2-(CF_2)_6CF_3$ (250 parts by mass) | $CH_3=CH-C_6H_5$ (250 parts by mass) | — | 140000 |
| 3 | $CH_2=CH-COO-(CH_2)_3-(CF_2)_6CF_3$ (200 parts by mass) | $CH_3=CH-C_6H_5$ (400 parts by mass) | — | 107000 |
| 4 | $CH_2=CH-COO-(CH_2)_2-(CF_2)_7CF_3$ (100 parts by mass) | — | — | 230000 |
| 5 | $CH_2=C(CH_3)-COO-(CH_2)_2-(CF_2)_7CF_3$ (100 parts by mass) | — | — | 125000 |
| 6 | $CH_2=CH-COO-(CH_2)_3-(CF_2)_8CF_3$ (10 parts by mass) | $CH_2=CH-C_6H_5$ (30 parts by mass) | $CH_3-CH-COO-CH_3$ (10 parts by mass) | 4900 |
| 7 | $CH_2=CH-COO-CH_2-(CF_2)_4CF_3$ (100 parts by mass) | $CH_2=CH-C_6H_5$ (300 parts by mass) | — | 113000 |

TABLE 1-continued

| Compound Examples | Fluorine-Containing Monomer (parts by mass) | Copolymerizable Monomer (parts by mass) | Copolymerizable Monomer (parts by mass) | Mass-Average Molecular Mass |
|---|---|---|---|---|
| 8 | CH$_2$=CH—C(=O)—O—(CH$_2$)$_2$—(CF$_2$)$_7$CF$_3$ with α-CH$_3$ (50 parts by mass) | CH$_2$=C(CH$_3$)—C(=O)—O—CH$_2$CH$_3$CH$_3$CH$_3$ (30 parts by mass) | — | 4500 |
| 9 | CH$_2$=CH—C(=O)—O—(CH$_3$)$_3$—(CF$_2$)$_7$CF$_3$ (100 parts by mass) | CH$_2$=CH—C(=O)—O—CH$_3$CH$_3$CH$_3$CH$_2$CH$_3$CH$_3$—CH$_3$CH$_3$ (100 parts by mass) | CH$_2$=C(CH$_3$)—C(=O)—O—CH$_2$CH$_2$CH$_3$CH$_3$ (100 parts by mass) | 31000 |
| 10 | CH$_2$=CH—C(=O)—O—(CH$_2$)$_3$—(CF$_2$)$_4$CFCF$_3$ with CF$_3$ branch (70 parts by mass) | CH$_2$=CH—C(=O)—O—CH$_2$CH$_3$CH$_2$CH$_3$ (30 parts by mass) | — | 8800 |
| 11 | CH$_2$=CH—C(=O)—O—CH$_2$—(CF$_2$)$_8$CF$_3$ (1000 parts by mass) | — | — | 280000 |
| 12 | CH$_2$=CH—C(=O)—O—CH$_3$CHCH$_2$—(CF$_3$)$_3$CF$_3$ with CH branch (200 parts by mass) | — | — | 41000 |
| 13 | CH$_2$=CH—C(=O)—O—(CH$_2$)$_2$—(CF$_3$)$_{19}$CF$_3$ (200 parts by mass) | — | — | 58000 |

Synthesis Example 14

—Synthesis of Fluorine-Containing Surfactant 14 by Bulk Polymerization—

A glass ampoule for freezing equipped with a stirrer was charged with 100 parts of 2-(perfluorooctyl) ethyl acrylate and 0.2 parts of AIBN (2,2'-azobisisobutyronitrile produced by Wako Pure Chemical Industries, Ltd.) during deaerating the ampoule with a vacuum pump, (1) freezing using Dewar vessel containing liquid nitrogen, followed by (2) thawing at room temperature. The operation from (1) to (2) was repeated approximately 20 times. After deaerating the ampoule, the upper portion of the ampoule was closed by heat-melting with a burner. The ampoule was placed and reacted in an oil bath at 120° C. for 72 hours while agitating the inside of the ample. After the reaction was terminated, the ampoule was cooled down to the room temperature. The upper portion of the ampoule was cut out and 500 parts of hexafluorobenzene was added therein to dissolve a reactant. This was dropped down to 10,000 parts of methanol to be subjected to reprecipitation purification. Subsequently, the reprecipitation purification was repeated 3 times to obtain a white Fluorine-Containing Surfactant 14 (yield 98 mass %). The mass-average molecular mass of the obtained Fluorine-Containing Surfactant 14 was 2,500,000 as measured by the same manner to that described in the Synthesis Example 1.

Synthesis Example 15

—Synthesis of Fluorine-Containing Surfactant 15 by Living Radical Polymerization—

A glass ampoule for freezing equipped with a stirrer was charged with 300 parts of 2-(perfluorooctyl) ethyl acrylate, 18 parts of 4-methoxy-2,2,6,6-tetramethylpiperidine 1-oxyl, and 10 parts of AIBN (2,2'-azobisisobutyronitrile produced by Wako Pure Chemical Industries, Ltd.) during deaerating the ampoule with a vacuum pump, (1) freezing using Dewar vessel containing liquid nitrogen, followed by (2) thawing at temperature. The operation from (1) to (2) was repeated approximately 20 times. After deaerating the ampoule, the upper portion of the ampoule was closed by heat-melting with a burner. The ampoule was placed in an oil bath at 90° C. and then the bath temperature was risen up to 155° C. over 30 minutes and reacted for 96 hours while agitating the inside of the ample. After the reaction was terminated, the ampoule was cooled down to the room temperature. The upper portion of the ampoule was cut out and 500 parts of hexafluorobenzene was added therein to dissolve a reactant. This was dropped down to 10,000 parts of methanol to be subjected to reprecipitation purification. Subsequently, the reprecipitation purification was repeated 3 times to obtain a white Fluorine-Containing Surfactant 15 (yield 97 mass %). The mass-average molecular mass of the obtained Fluorine-Containing Surfactant 15 was 95,000 as measured by the same manner to that described in the Synthesis Example 1.

Example 1

—Preparation of Toner 1—

55 parts of styrene and 45 parts of methyl acrylate, 0.3 parts of Fluorine-Containing Surfactant 1, 0.3 parts of divinylbenzene, 10 parts of pentaerythritol tetrastearate (stearic acid: purity approximately 60%), and 2 parts of natural gas-based Fischer-Tropsh wax (FT-100, produced by D Shell MS, melting point: 92° C.) as a releasing agent were vigorously mixed to disperse uniformly together using a TK homomixer (a high-shearing force mixer manufactured by Tokushu Kika Co., Ltd.) at 11,000 rpm. In this way "Monomer Mixture Solution 1" was prepared.

Subsequently, a pressure-resistant reaction cell was charged with 100 parts of Monomer Mixture Solution 1. Carbon dioxide was selected as a supercritical fluid and supplied from a gas container to the pressure-resistant reaction cell. The cell pressure was controlled to 30 MPa using a pressure pump, and the cell temperature was controlled to 85° C. using a temperature controller. To the reaction cell was added 0.5 parts of AIBN (2,2'-azobisisobutyronitrile produced by Wako Pure Chemical Industries, Ltd.) allowing a reaction to take place for 24 hours.

After termination of the reaction, using a back pressure valve, supercritical carbon dioxide was removed to the outside at a flow rate of 5.0 L/min over 6 hours, and monomers left over were removed. Thereafter, 0.5 parts of Oil Black HBB (produced by Orient Chemical Industries, Ltd.) and 0.02 parts of Oil Orange 201 (produced by Orient Chemical Industries, Ltd.) were added, and the resultant polymer was allowed to stand for 1 hour for coloring. The pressure-resistant reaction cell was then gradually brought to normal temperature and pressure to prepare "Toner 1,"

<Solubility for Supercritical Carbon Dioxide>

One gram of the polymer resulted from the polymerizable monomer (Toner 1) was mixed with supercritical carbon dioxide in a high-pressure vessel (internal volume: 50 ml) having an inspection window and allowed to stand for 30 minutes. The polymer was not dissolved in the supercritical fluid—the fluid was cloudy or phase separation was enacted when seen through the inspection window.

Example 2

—Preparation of Toner 2—

80 parts of styrene, 20 parts of n-butyl acrylate, 10 parts of Fluorine-Containing Surfactant 2, 0.5 parts of divinylbenzene, 5 parts of Carnauba wax CWT101 (produced by Toyo-Petrolite Corp.) as a releasing agent, and 7 parts of C. I. Pigment Blue (15:3) were vigorously mixed together to disperse uniformly using a TK homomixer (a high-shearing force mixer manufactured by Tokushu Kika Co., Ltd.) at 11,000 rpm. In this way "Monomer Mixture Solution 2" was prepared.

To a pressure-resistant reaction cell equipped with the homomixer was added 100 parts of Monomer Mixture Solution 2 and 1 part of silica particles (average particle diameter: 20 nm) as a dispersing agent. As a supercritical fluid, carbon dioxide was selected and supplied from a gas container to the pressure-resistant reaction cell. The cell pressure was controlled to 10 MPa using a pressure pump, and the cell temperature was controlled to 65° C. using a temperature controller. To the pressure-resistant reaction cell was added 5 parts of V-65 (2,2'-azobis(2,4-dimethylvaleronitrile) produced by Wako Pure Chemical Industries, Ltd.) as a polymerization initiator, with agitation at 10,000 rpm, allowing a reaction to take place for 24 hours.

After termination of the reaction, using a back pressure valve, supercritical carbon dioxide was removed to the outside at a flow rate of 5.0 L/min over 6 hours, and monomers left over were removed. The pressure-resistant reaction cell was gradually brought to normal temperature and pressure to prepare "Toner 2."

<Solubility for Supercritical Carbon Dioxide Fluid>

One gram of the polymer resulted from the polymerizable monomer (Toner 2) was mixed with supercritical carbon dioxide fluid in a high-pressure vessel (internal volume: 50 ml) having an inspection window and allowed to stand for 30 minutes. The polymer was not dissolved in the supercritical fluid—the fluid was cloudy or phase separation was enacted when seen through the inspection window.

Example 3

—Preparation of Toner 3—

70 parts of styrene, 20 parts of n-butyl methacrylate, 10 parts of 2-ethylhexyl methacrylate, 1 part of Fluorine-Containing Surfactant 3, and 0.3 parts of divinylbenzene were vigorously mixed together to disperse uniformly using a TK homomixer (a high-shearing force mixer manufactured by Tokushu Kika Co., Ltd.) at 11,000 rpm. In this way "Monomer Mixture Solution 3" was prepared.

To a pressure-resistant reaction cell equipped with the homomixer was added 5 parts of synthesized ester wax WEP05 (produced by NOF Corp.) and 7 parts of C. I. Pigment Blue (15:3). As a supercritical fluid, carbon dioxide was selected and supplied from a gas container to the pressure-resistant reaction cell. The cell pressure was controlled to 25 MPa using a pressure pump, and the cell temperature was controlled to 80° C. using a temperature controller, followed by full agitation at 10,000 rpm. Thereafter, the pressure-resistant reaction cell was controlled to 25 MPa and 50° C. to prepare "Dispersion 1."

To a pressure-resistant reaction cell equipped with the stirrer was added 100 parts of Monomer Mixture Solution 3. As a supercritical fluid, carbon dioxide was selected and supplied from a gas container to the pressure-resistant reaction cell. The cell pressure was controlled to 25 MPa using a pressure pump, and the cell temperature was controlled to 80° C. using a temperature controller. To the reaction cell was added 2 parts of AIBN (2,2'-azobisisobutyronitrile produced by Wako Pure Chemical Industries, Ltd.) with agitation, allowing a reaction to take place for 24 hours.

After termination of the reaction, using a back pressure valve, supercritical carbon dioxide was removed to the outside at a flow rate of 5.0 L/min over 6 hours, and monomers left over were removed. Dispersion 1 was then added to the cell to be aggregated and cohered at 25 MPa and 50° C. to prepare "Toner 3."

<Solubility for Supercritical Carbon Dioxide Fluid>

One gram of the polymer resulted from the polymerizable monomer (Toner 3) was mixed with supercritical carbon dioxide fluid in a high-pressure vessel (internal volume: 50 ml) having an inspection window and allowed to stand for 30 minutes. The polymer was not dissolved in the supercritical fluid—the fluid was cloudy or phase separation was enacted when seen through the inspection window.

Examples 4 to 12

—Preparation of Toners 4 to 12—

Except that the Fluorine-Containing Surfactants 4 to 12 shown in Table 1 were used in stead of the Fluorine-Containing Surfactant 1 in Example 1, Toners 4 to 12 were respectively prepared in the same manner to that described in Example 1.

<Solubility for Supercritical Carbon Dioxide Fluid>

One gram of the polymer resulted from the polymerizable monomers (Toners 4 to 12) were respectively mixed with supercritical carbon dioxide fluid in a high-pressure vessel (internal volume: 50 ml) having an inspection window and allowed to stand for 30 minutes. The respective polymers were not dissolved in the supercritical fluid—the fluids were cloudy or phase separations were enacted when seen through the inspection window.

Example 13

—Preparation of Toner 13—

Except that 40 parts of perfluorooctyl acrylate was used in stead of the Fluorine-Containing Surfactant 1 in Example 1, Toner 13 was prepared in the same manner to that described in Example 1.

<Solubility for Supercritical Carbon Dioxide Fluid>

One gram of the polymer resulted from the polymerizable monomer (Toner 13) was mixed with supercritical carbon dioxide fluid in a high-pressure vessel (internal volume: 50 ml) having an inspection window and allowed to stand for 30 minutes. The polymer was not dissolved in the supercritical fluid—the fluid was cloudy or phase separation was enacted when seen through the inspection window, Example 14

—Preparation of Toner 14—

Except that the Fluorine-Containing Surfactant 13 in the Synthesis Example 13 was used in stead of the Fluorine-Containing Surfactant 1 in Example 1, Toner 14 was prepared in the same manner to that described in Example 1.

<Solubility for Supercritical Carbon Dioxide Fluid>

One gram of the polymer resulted from the polymerizable monomer (Toner 14) was mixed with supercritical carbon dioxide fluid in a high-pressure vessel (internal volume: 50 ml) having an inspection window and allowed to stand for 30 minutes. The polymer was not dissolved in the supercritical fluid—the fluid was cloudy or phase separation was enacted when seen through the inspection window.

Example 15

—Preparation of Toner 15—

Except that the Fluorine-Containing Surfactant 14 in the Synthesis Example 14 was used in stead of the Fluorine-Containing Surfactant 1 in Example 1, Toner 15 was prepared in the same manner to that described in Example 1.

<Solubility for Supercritical Carbon Dioxide Fluid>

One gram of the polymer resulted from the polymerizable monomer (Toner 15) was mixed with supercritical carbon dioxide fluid in a high-pressure vessel (internal volume: 50 ml) having an inspection window and allowed to stand for 30 minutes. The polymer was not dissolved in the supercritical fluid—the fluid was cloudy or phase separation was enacted when seen through the inspection window.

Example 16

—Preparation of Toner 16—

Except that the Fluorine-Containing Surfactant 15 in the Synthesis Example 15 was used in stead of the Fluorine- Containing Surfactant 1 in Example 1, Toner 16 was prepared in the same manner to that described in Example 1.

<Solubility for Supercritical Carbon Dioxide Fluid>

One gram of the polymer resulted from the polymerizable monomer (Toner 16) was mixed with supercritical carbon dioxide fluid in a high-pressure vessel (internal volume: 50 ml) having an inspection window and allowed to stand for 30 minutes. The polymer was not dissolved in the supercritical fluid—the fluid was cloudy or phase separation was enacted when seen through the inspection window.

Comparative Example 1

—Preparation of Comparative Toner 1—

A hermetically-sealable reaction vessel equipped with a blade stirrer, a cooling condenser and a nitrogen gas inlet tube was installed to a temperature-controlled water bath, and charged with 70 parts of ethanol, 30 parts of distilled water, and 4 parts of polyvinylpyrolidone. Subsequently, the blade stirrer was rotated so as to completely dissolve polyvinylpyrolidone, and the reaction. vessel was charged with 28 parts of styrene, 10 parts of ethyl acrylate, 2 parts of n-butyl methacrylate, 0.2 parts of ethyleneglycol dimethacrylate, 0.03 parts of carbon tetrachloride, and 0.6 parts of benzoyl peroxide. While rotating the blade stirrer, nitrogen gas was introduced in the vessel to completely remove oxygen therefrom. The water bath was then heated to $50\pm0.1°$ C. to start polymerization reaction. Two hours later, the water bath was heated to $65\pm0.1°$ C. to increase the reaction rate.

After 12 hours from the start of the polymerization reaction, the water bath was cooled to room temperature to prepare a dispersion of Resin Particles 1. An aliquot of the dispersion was subjected to gas chromatography using an internal standard method, consequently it was ascertained that the degree of polymerization was greater than 90%.

Next, 30 parts of Solvent Black was dissolved in 20 parts of ethanol by heat, and non-dissolved ingredients were removed by filtration through a 1 μm-pore diameter filter. Thereafter, 20 parts of the flow-through, 100 parts of ethanol, and 100 parts of Resin Particle 1 were measured into a vessel, and agitated at 50° C. for 1 hour for the coloring of the Resin Particle 1. The obtained colored solution was then cooled to room temperature. The resin particles were precipitated by centrifugation, the supernatant was removed, and the resin particles were dispersed in ethanol 3 times. The resin particle solution was filtrated to produce "Comparative Toner 1."

Comparative Example 2

—Preparation of Comparative Toner 2—

—Preparation of Resin Paste—

A raw material consisting of 178 parts of styrene-acrylic resin (glass transition temperature of 65° C.) and 10 parts of Carnauba wax CWT01 (produced by Toyo-Petrolite Corp.) was placed into a HENSCHEL MIXER, and agitated for 10 minutes to produce a raw material mixture. Using Kneadics MOS140-800 (manufactured by Mitsui Mining Co., Ltd.), this raw material mixture was mixed thoroughly by melting and kneading at a temperature 130° C. to prepare Resin Paste (P-1).

—Supercritical Polymerization Step—

A pressure-resistant reaction cell (internal volume: 1,000 ml) equipped with a mixer having a comb-shaped blade stirrer, a heater, a thermometer and a pressure monitor was charged with 150 parts of the Resin Paste (P-1), 10 parts of Fluorine-Containing Surfactant 2, 10 parts of phthalocyanine pigment (C. I. Pigment Blue (15:3)) and 1 part of a charge controlling agent (aluminum salicylate). As a supercritical fluid, carbon dioxide was selected and supplied from a gas container to the pressure-resistant reaction cell. The cell pressure was controlled to 25 MPa using a pressure pump, and the cell temperature was controlled to 90° C. using a temperature controller, followed by agitation at 3,000 rpm for 3 hours. The resultant mixture was cooled to 4° C., and a pressure-reducing valve was gradually released to prepare "Comparative Toner 2."

<Solubility for Supercritical Carbon Dioxide Fluid>

One gram of the styrene-acrylic resin was mixed with a supercritical carbon dioxide fluid in a high-pressure vessel (internal volume: 50 ml) having an inspection window, and the mixture was stirred for 30 minutes at 25 MPa and 90° C. 15 The styrene-acrylic resin was not dissolved in the supercritical fluid—the phase separation was enacted when seen through the inspection window.

<Measurement of Mass-Average Particle Diameter and Particle Size Distribution>

Each of the thus obtained toners was subjected to the measurements of mass-average particle diameter and particle size distribution using the Coulter Counter method by means of Coulter Multisizer II(manufactured by Beckmann. Coulter Inc.)

First, as a dispersing agent, 0.1 ml to 5 ml of a surfactant (alkylbenzene sulfonate) was added to 100 ml to 150 ml of an electrolytic solution. Note that the electrolytic solution was a 1 mass % aqueous solution of NaCl prepared using primary sodium chloride (ISOTON-II by Beckmann Coulter Inc.). Subsequently, 2 mg to 20 mg of sample to be measured was further added. The sample suspension was sonicated for 1 minute to 3 minutes using an ultrasonicator. Using the measurement instrument of 100 μm-aperture, the mass and the number of toner particles were measured to produce its mass distribution and number distribution, from which the mass-average particle diameter (D4) and number-average particle diameter (Dn) were obtained. The results are shown in Table 2.

For channels, 13 different channels were used—from 2.00 μm or more to less than 2.52 μm; from 2.52 μm or more to less than 3.17 μm; from 3.17 μm or more to less than 4.00 μm; from 4.00 μm or more to less than 5.04 μm; from 5.04 μm or more to less than 6.35 μm; from 6.35 μm or more to less than 8.00 μm; from 8.00 μm or more to less than 10.08 μm; from 10.08 μm or more to less than 12.70 μm; from 12.70 μm or more to less than 16.00 μm; from 16.00 μm or more to less than 20.20 μm; from 20.20 μm or more to less than 25.40 μm; from 25.40 μm or more to less than 32.00 μm; and from 32.00 μm or more to less than 40.30 μm—targeting particles with a diameter of from 2.00 μm or more to less than 40.30 μm.

From the mass-average particle diameter (D4) and number-average particle diameter (Dn) of each of the obtained toners, ratio of D4/Dn was calculated to evaluate the particle size distribution for each of the toners based on the criteria below. The results are shown in Table 2.

Evaluation criteria are:

S: D4/Dn value is less than 1.15

A: D4/Dn value is from 1.15 or more to less than 1.25

B: D4/Dn value is from 1.25 or more to less than 1.50

C: D4/Dn value is 1.50 or more

—Preparation of Developers—

Using a HENSCHEL MIXER, 100 parts of each of the obtained toners was mixed with 0.7 parts of hydrophobic silica and 0.3 parts of hydrophobic titanium oxide. Subsequently, developers were prepared, each of which is consisting of 5% by mass of toner and 95% by mass of silicone resin-coated cupper-zinc ferrite carrier with an average particle diameter of 40 μm.

For each of the obtained developers, image density, occurrence of toner adhesion to the photoconductor, charge density, and comprehensive evaluation were determined in the following way. The results are shown in Table 2.

<Image Density>

For the each developer, a solid image was formed on copy sheets (Type 6000<70W>, Ricoh Company, Ltd.) using Imagio Neo 450 (a tandem color image-forming apparatus, Ricoh Company, Ltd.), with the deposited amount of the each developer being 1.00±0.05 mg/cm$^2$. Formation of solid image was repeated on 8,000 sheets. The image densities of two sheets—the first one and 8,000th one—were determined by visual inspection based on the following criteria. This evaluation corresponds to the examples of the image-forming method of the present invention and the image-forming apparatus using the toner of the present invention.

Evaluation criteria are:

A: No image density change between the first and 8,000th sheets, both providing high-image quality B: The image density and image quality of the 8,000th sheet is slightly reduced C: The image density and image quality of the 8,000th sheet is significantly reduced <Toner Adhesion>

After the solid image forming on 8,000 sheets according to the above-description, the occurrence of toner adhesion to the organic photoconductor (OPC) was determined by visual inspection, and evaluations were made based on the following criteria:

A: No toner adhesion to the photoconductor

B: A slight amount of toner adhesion to the photo conductor

C: A large amount of toner adhesion to the photoconductor

<Charge Density>

Six grams of each developer was measured into a sealable metallic cylinder and blown off to measure the charge density. Note that the toner concentration was adjusted to 4.5% by mass to 5.5% by, mass.

<Comprehensive Evaluation>

By combining the results of the above evaluations, comprehensive evaluations were made on toners based on the following criteria:

A: Good

B: Bad

TABLE 2

| | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Mass-average particle diameter (D4) (μm) | 6.7 | 7.3 | 7.5 | 5.8 | 6.2 | 5.3 | 7.8 | 6.5 | 8.4 | 7.6 |
| Number-average particle diameter (Dn) (μm) | 6.0 | 6.4 | 6.6 | 5.6 | 5.7 | 5.6 | 6.9 | 5.8 | 7.4 | 6.8 |
| D4/Dn | 1.12 | 1.14 | 1.14 | 1.04 | 1.09 | 1.13 | 1.13 | 1.12 | 1.14 | 1.12 |
| Particle size distribution | S | S | S | S | S | S | S | S | S | S |
| Image density | A | A | A | A | A | A | A | A | A | A |
| Toner adhesion to photoconductor | A | A | A | A | A | A | A | A | A | A |
| Charge density (μC/g) | −35 | −32 | −36 | −37 | −33 | −36 | −30 | −33 | −35 | −34 |
| Comprehensive Evaluation | A | A | A | A | A | A | A | A | A | A |

| | Ex. 11 | Ex. 12 | Ex. 13 | Ex. 14 | Ex. 15 | Ex. 16 | Compara. Ex. 1 | Compara. Ex. 2 |
|---|---|---|---|---|---|---|---|---|
| Mass-average particle diameter (D4) (μm) | 5.6 | 6.3 | 8.9 | 6.4 | 5.2 | 5.8 | 6.83 | 13.5 |
| Number-average particle diameter (Dn) (μm) | 5.4 | 5.8 | 7.4 | 6.1 | 5.0 | 5.5 | 6.04 | 5.2 |
| D4/Dn | 1.04 | 1.09 | 1.20 | 1.05 | 1.04 | 1.05 | 1.13 | 2.60 |
| Particle size distribution | S | S | A | S | S | S | S | C |
| Image density | A | A | A | A | A | A | C | B |
| Toner adhesion to photoconductor | A | A | A | A | A | A | B | C |
| Charge density (μC/g) | −33 | −38 | −30 | −38 | −39 | −38 | −10 | −15 |
| Comprehensive Evaluation | A | A | A | A | A | A | B | B |

From the results shown in Table 2, it is established that in contrast to the toners of Comparative Example 1, the toners of Examples 1 to 16 have excellent charging properties, and can provide high-image densities.

It is also established that toner of Comparative Example 1 has a low image density because it is less likely to be colored with dyes, but the toners of Examples 1 to 16 have sufficient coloring and image density because the dye explore the inside of the resin particles.

Toner of Comparative Example 2 is the one produced by dissolving a styrene-acrylic resin into a supercritical fluid and allowing toner particles to precipitate. Because the solubility of the styrene-acrylic resin into the supercritical fluid is extremely low, the distribution is very wide with a mass-average particle diameter (D4) of 13.5 μm, a number-average particle diameter (Dn) of 5.2 μm, and the ratio (D4)/(Dn) of 2.60, as well as fine particles and coarse particles have been produced, thus the toner of Comparative Example 2 has not been obtained a sharp particle size distribution.

In addition, the method for producing the toner of the present invention entails little generation of waste solution and can provide a dry toner just by bringing the reaction cell to normal pressure. Accordingly, this method for producing the toner features low cost and low environmental impacts and requires the minimum amount of energy and resources, making it advantageous over conventional processes.

The toner of the present invention produced by the method for producing the toner of the present invention has a sharp particle diameter distribution and excellent toner characteristics such as charging properties, environmental impact, and temporal stability, is low cost, creates little waste solution, requires no drying process, contains no monomers left over, and features low environmental impact. Thus, the toner of the present invention can be widely used for laser printers, direct digital plate-making systems, full-color copiers using direct- or indirect-electrographic multicolor image developing setup, full-color laser printers, full-color plain paper faxes, and the like.

What is claimed is:

1. A method for producing a toner comprising:
   polymerizing at least monomers in at least one of a supercritical fluid and a subcritical fluid to thereby produce toner particles,
   wherein at least one of the supercritical fluid and the subcritical fluid comprises a fluorine-containing surfactant,
   wherein a polymer resulted from polymerization of the monomers is insoluble in at least one of the supercritical fluid and the subcritical fluid,
   wherein the fluorine-containing surfactant is a compound comprising a unit represented by the General Formula (1):

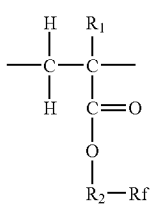

General Formula (1)

where $R_1$ represents a hydrogen atom or an alkyl group having 1 to 4 carbon atoms, $R_2$ represents a substituted or unsubstituted alkylene group having 1 to 4 carbon atoms, and Rf represents a perfluoroalkyl group having 1 to 20 carbon atoms.

2. A method for producing a toner according to claim 1, wherein at least one of the supercritical fluid and the subcritical fluid further comprises at least a carbon dioxide.

3. A method for producing a toner according to claim 1, wherein a relative proportion of the unit represented by the General Formula (1) in the fluorine-containing surfactant is 1 mole % to 100 mole %.

4. A method for producing a toner according to claim 1, wherein the reaction is carried out in a supercritical carbon dioxide.

5. A method for producing a toner according to claim 1, wherein the reaction is either a bulk polymerization or a living radical polymerization.

6. A method for producing a toner according to claim 1, wherein a mass-average molecular mass of the fluorine-containing surfactant is 400 to 10,000,000.

7. A method for producing a toner according to claim 1, wherein a content of the fluorine-containing surfactant is 0.01 parts by mass to 50 parts by mass based on 100 parts by mass of the monomer.

8. A method for producing a toner according to claim 1, wherein the monomer is polymerized under the pressure of 8 MPa to 100 MPa.

9. A method for producing a toner according to claim 1, wherein the monomer is polymerized at 30° C. to 150° C.

10. A method for producing a toner according to claim 1, wherein at least one of the supercritical fluid and the subcritical fluid further comprises a releasing agent.

11. A toner produced by the method according to claim 1.

12. A toner according to claim 11, wherein the toner has a mass-average particle diameter of 3 μm to 10 μm, and a ratio of the mass-average particle diameter to the number-average particle diameter (mass-average particle diameter/number-average particle diameter) of 1.00 to 1.25.

13. An image-forming method comprising:
   forming a latent electrostatic image on a latent electrostatic image bearing member,
   developing the latent electrostatic image using a toner to form a visible image,
   transferring the visible image onto a recording medium, and
   fixing the transferred visible image on the recording medium,
   wherein the toner is produced by the method according to claim 1.

* * * * *